(12) United States Patent
Yamamoto

(10) Patent No.: US 6,980,367 B2
(45) Date of Patent: Dec. 27, 2005

(54) SCANNING TYPE DISPLAY OPTICAL SYSTEM

(75) Inventor: Akira Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 10/686,807

(22) Filed: Oct. 15, 2003

(65) Prior Publication Data
US 2004/0075914 A1 Apr. 22, 2004

(30) Foreign Application Priority Data
Oct. 17, 2002 (JP) .................................. 2002-303442

(51) Int. Cl.[7] ............................................. G02B 26/08
(52) U.S. Cl. ...................................................... 359/662
(58) Field of Search .................................. 359/662, 206

(56) References Cited

U.S. PATENT DOCUMENTS 5,467,104 A 11/1995 Furness, III et al.
5,557,444 A 9/1996 Melville et al.
5,903,397 A 5/1999 Melville et al.

FOREIGN PATENT DOCUMENTS

| JP | 08-146320 | 6/1996 |
|---|---|---|
| JP | 10-068876 | 3/1998 |
| JP | 2001-004955 | 1/2001 |

Primary Examiner—Scott J. Sugarman
(74) Attorney, Agent, or Firm—Morgan & Finnegan, LLP

(57) ABSTRACT

A scanning display optical system is disclosed that can optically correct the distortion of images formed by two-dimensional scanning of a light beam. The scanning display optical system comprises a deflection device deflecting a light beam from a light source two-dimensionally and an image-forming optical system forming an image with the light beam deflected by the deflection device. A direction from which the light beam coming from the light source is incident on the deflection device is oblique with respect to at least one of the two deflection axes of the deflection device. The image-forming optical system includes an optical element which is tilted and/or shifted with respect to a center axis of a two-dimensional deflection range over which the light beam is deflected by the deflection device.

30 Claims, 27 Drawing Sheets

ASTIGMATIC DIFFERENCE

DISTORTION

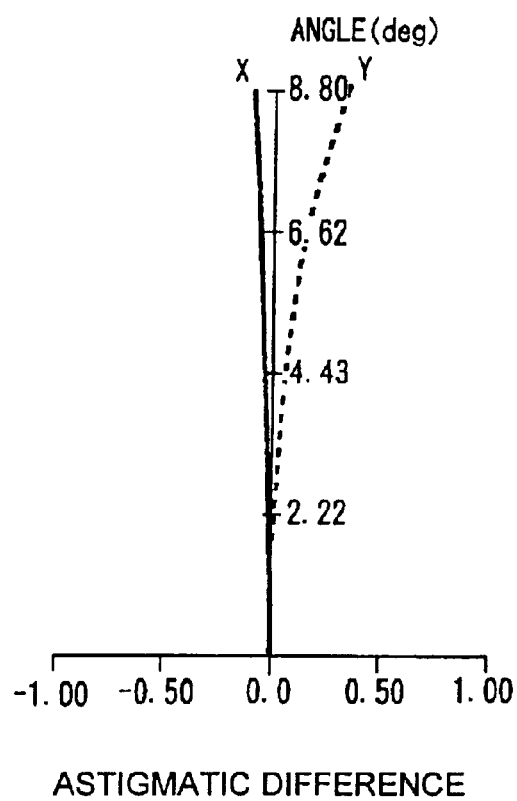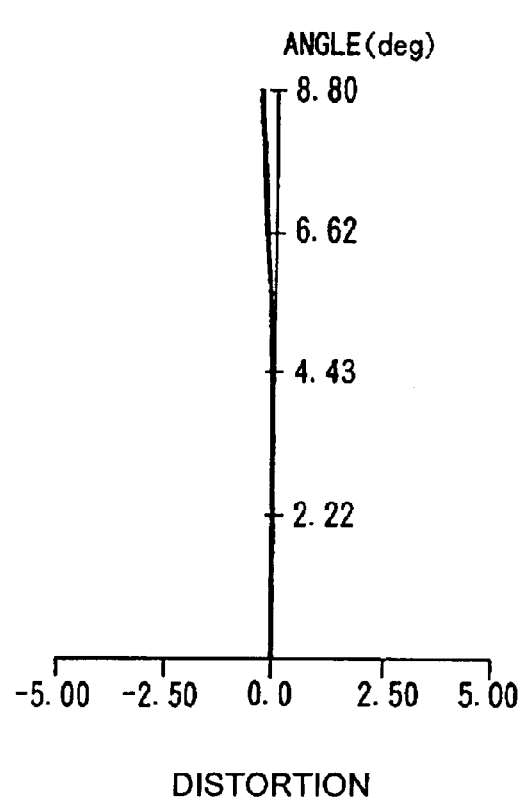

ASTIGMATIC DIFFERENCE

DISTORTION

ASTIGMATIC DIFFERENCE

DISTORTION

SCANNING TYPE DISPLAY OPTICAL SYSTEM

BACKGROUND OF THE INVENTION

1. Field of the Invention

The present invention relates to scanning type display optical systems in which a two-dimensional image is formed by deflecting and scanning a light beam in two dimensions.

2. Description of Related Art

Until now, a number of retinal scanning display optical systems rendering images directly on an observer's retina have been proposed, that utilize the effect of after-images and deflect and scan a light beam emitted from a light source in two dimensions with an optical deflection device.

For example, U.S. Pat. Nos. 5,557,444, 5,467,104, and 5,903,397 disclose the principle of a retinal scanning display. Such displays form images on a primary image-forming plane with a light beam that is deflected in two dimensions, and form a two-dimensional image on the observer's retina with an eyepiece optical system Japanese Patent Application Laid-Open No. 2001-4955 discloses a display optical system rendering images directly on an observer's retina, that includes at least one prism. The prism has at least three surfaces, that is, an incident surface, an internal reflective surface and an emergent surface. Deflected light beam is reflected at least three times inside the prism, and at least one of the reflective surfaces has a certain optical power.

Moreover, a display optical system of the two-dimensional scanning type has also been proposed, which forms two-dimensional images by scanning the image plane two-dimensionally with a spot. Here, with a retinal scanning display optical system rendering images directly on an observer's retina, the moving characteristics of the scanning spot and the image plane size on the image plane change due to defocusing of the scanning spot on the image plane that occurs when a light beam is deflected. This leads to changes in the field angle and to image distortions.

In order to address this problem, Japanese Patent Application Laid-Open No. H10(1998)-68876 discloses an optical system that is provided with such telecentricity that the moving characteristics of the scanning spot on the image plane do not deviate from fθ characteristics as a result of defocusing when deflecting a light beam.

Furthermore, Japanese Patent Application Laid-Open No. H8(1996)-146320 discloses a two-dimensional scanning optical system, in which a light beam emitted from a light source is deflected two-dimensionally and scanned two-dimensionally over a scanned plane by a scanning lens having f·sin θ characteristics as distortion characteristics. This is supposed to correct distortions of the displayed image with the f·sin θ characteristics of the scanning lens and an electrical correction.

However, U.S. Pat. Nos. 5,557,444, 5,467,104, and 5,903,397 do not disclose a specific optical structure of the retinal scanning display.

Also, in structures using reflective surfaces inside the prism as disclosed in Japanese Patent Application Laid-Open No. 2001-4955, optical loss becomes a problem, because the reflectance of the optical member is ordinarily low compared to the transmittance. In particular when three or more reflective surfaces are used, the optical loss becomes large.

Furthermore, even though the two-dimensional scanning optical system proposed in Japanese Patent Application Laid-Open No. H10(1998)-68876 is telecentric and changes in the moving characteristics of the scanning spot on the image plane due to defocusing are small, its application is for light sources of infrared wavelengths of at least 10 μm, and it is not suited for use in the visible spectrum. Moreover, this publication does not disclose anything regarding the use of a plurality of light sources of different wavelengths.

Moreover, since in the two-dimensional scanning optical system proposed in Japanese Patent Application Laid-Open No. H8(1996)-146320, the size of the image plane changes and the characteristics on the image plane change when the image plane comes out of focus, it is difficult to use it for applications in which constant distortion characteristics are desired.

Moreover, it is known that image distortions occur on the image plane when a two-dimensional image is formed by scanning and deflecting a light beam in two dimensions. Such image distortions include trapezoidal distortion, constant-speed scanning distortion, rectilinear scanning distortion, and furthermore TV distortion, in which the frame of the image formed on the image plane is distorted. In particular if the direction from which the light beam coming from a light source is incident on the light deflection member is oblique with respect to the deflection axes of the light deflection member, the TV distortion and the trapezoidal distortion become large.

However, with the electrical correction employed in the two-dimensional optical system proposed in Japanese Patent Application Laid-Open No. H8(1996)-146320, an effective correction of the TV distortion is difficult. And Japanese Patent Application Laid-Open No. H10(1998)-68876 does not disclose anything regarding the correction of TV distortion.

SUMMARY OF THE INVENTION

It is an object of the present invention to present a scanning type display optical system which can optically correct distortion of images formed by two-dimensional scanning of a light beam, and with which high-quality images can be observed.

To attain this object, a scanning type display optical system according to a first aspect of the present invention includes a deflection device deflecting a light beam from a light source in two dimensions, an image-forming optical system forming an image with the light beam deflected by the deflection device. A direction from which the light beam coming from the light source is incident on the deflection device is oblique with respect to at least one of the two deflection axes of the deflection device. The image-forming optical system includes an optical element which is tilted and/or shifted with respect to a center axis of a two-dimensional deflection range over which the light beam is deflected by the deflection device.

A scanning type display optical system according to a second aspect of the present invention includes a deflection device deflecting a light beam from a light source in two dimensions, an image-forming optical system forming an image with the light beam deflected by the deflection device. The image-forming optical system includes a first optical element having negative optical power, which is arranged on the side closest to the deflection device, and a second optical element having positive optical power, which is arranged on the side closest to an image plane. The second optical element is a meniscus lens whose convex surface faces toward the deflection device.

These and further objects and features of the scanning type display optical system of the present invention will become apparent from the following detailed description of preferred embodiments thereof taken in conjunction with the accompanying drawings.

BRIEF DESCRIPTION OF THE DRAWINGS

FIGS. 7A and 7B show aberration graphs of the scanning type optical system in Embodiment 2.

DETAILED DESCRIPTION OF THE PREFERRED EMBODIMENTS

The following is an explanation of preferred embodiments of the present invention, with reference to the accompanying drawings.

Embodiment 1

Figure 1:
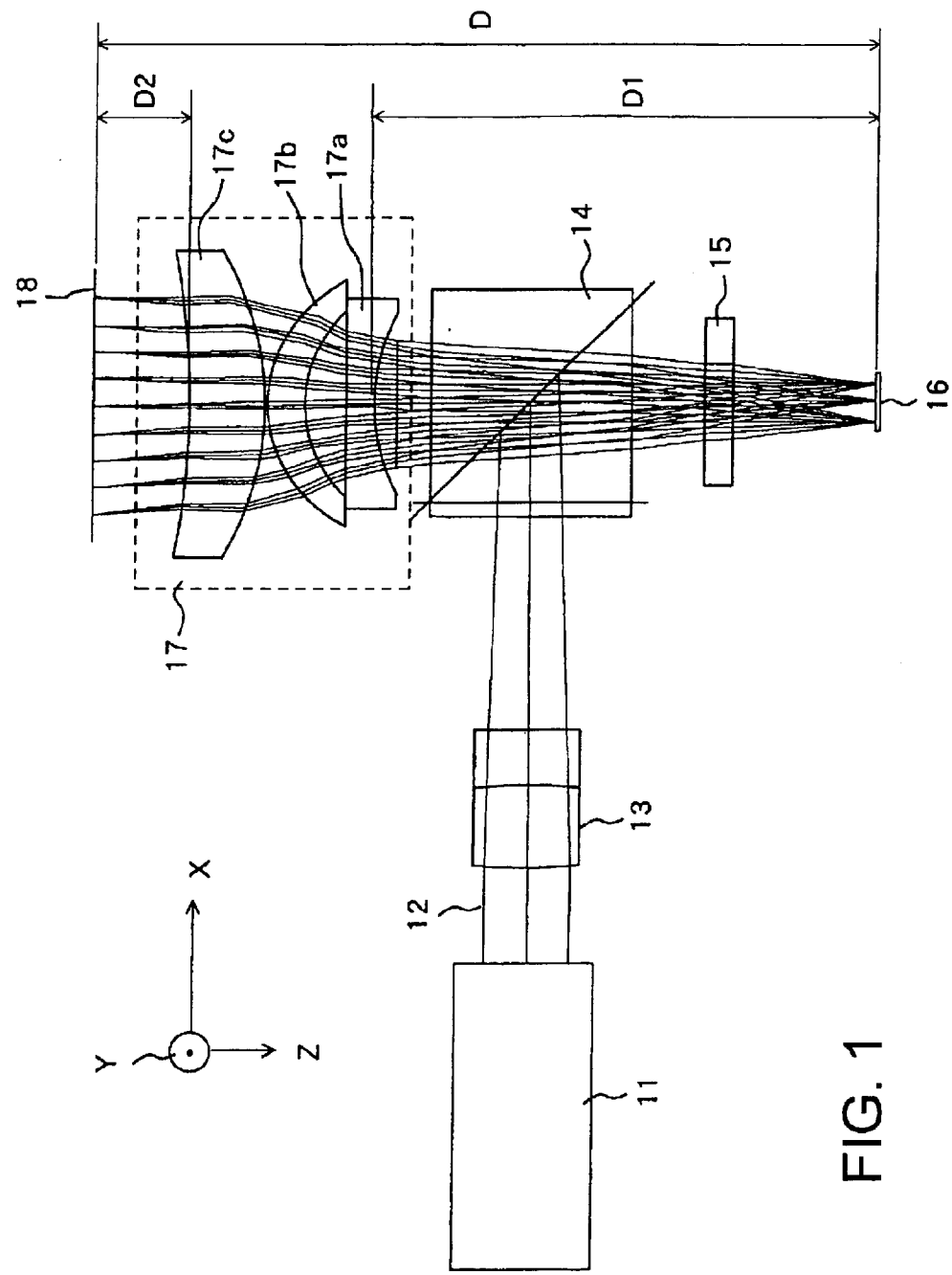
FIG. 1 shows a vertical sectional view of a scanning type display optical system according to Embodiment 1 of the present invention.

FIG. 1 shows a vertical section (XZ section; this is the same in the following embodiments) of a scanning type display optical system according to Embodiment 1 of the present invention. In FIG. 1, numerical reference 11 denotes a light source, which is configured by a laser diode, an LED, a lamp or the like. The light emission of the light source 1 is controlled with a driving circuit (not shown in the drawings) into which an image signal is input. An image information supplying apparatus, such as a personal computer, a DVD player, a TV tuner, a video deck or the like, is connected to the driving circuit, and the driving circuit controls the light emission of the light source 11 based on the image signal from this image information supplying apparatus.

A Light beam (parallel light rays) 12 emitted from the light source 11 is converted into converging light beam by a converging lens 13 that is made by cementing together two condensing lenses, and are incident onto a half mirror 14. The reflection at the half mirror 14 bends the light beam 12 by 90°, the light beam 12 is incident on a deflection device 16 and after passing through a protective glass 15. The protective glass 15 is provided in order to protect the deflection device 16 from outer influences (intrusion of dust and water, for example).

As the deflection device 16, a MEMS (micro-electromechanical system) device is used. The deflection device 16 can, for example, swing a reflective surface two-dimensionally about swing axes (deflection axes) perpendicular to one another, and deflect light beam that is incident on the reflective surface and reflected by it in two directions (X-direction and Y-direction). The driving of the deflection device 16 is performed in synchronization with the light emission control of the light source 11 with the driving circuit.

The light beam 12 deflected and scanned in two dimensions by the deflection device 16 is incident on a scanning optical system 17 (image-forming optical system) serving as a first optical system after passing through the protective glass 15 and the half mirror 14.

The scanning optical system 17 comprises a first lens 17a, a second lens 17c and a third lens 17b, which are optical elements. The first lens 17a is arranged on the side closest to the deflection device 16. The second lens 17c is arranged on the side closest to an image plane 18 of the scanning optical system 17. The third lens 17b is arranged between the first lens 17a and the second lens 17c. The scanning optical system 17 forms an image on the image plane 18 with the light beam 12 deflected by the deflection device 16.

By thus letting the scanning optical system 17 form an image on the image plane 18 with the light beam 12 deflected and scanned in two dimensions by the deflection device 16, a two-dimensional image is formed due to the after-image effect of the light on the image plane 18.

Figure 2:
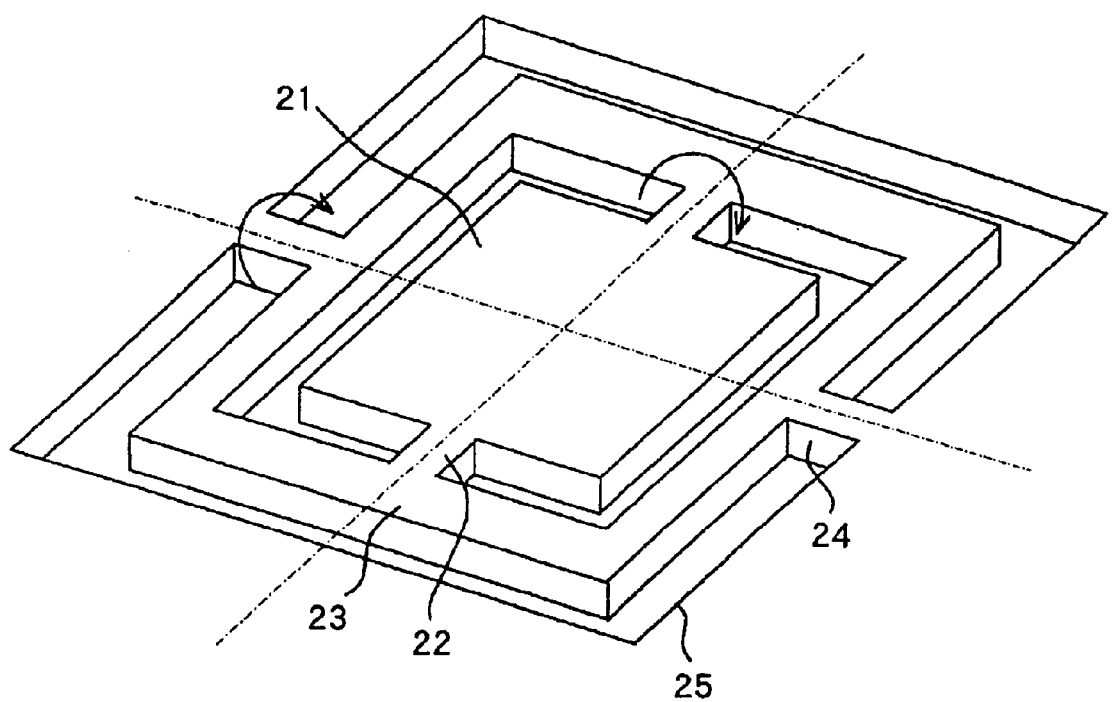
FIG. 2 is a schematic diagram of a deflection device (MEMS device) used in Embodiment 1.

Referring to FIG. 2, the following is a simple explanation of the structure of the MEMS device used for the deflection device 16. This MEMS device has a tiny deflection mirror 21, which is supported by a swing frame 23 via a torsion bar (deflection axis) 22. The swing frame 23 is supported by a casing 25 via a torsion bar (deflection axis) 24 that is perpendicular to the torsion bar 22. The deflection mirror 21 responds to a magnetic force generated from a coil (not shown in the drawing) by a magnet (not shown in the drawing) arranged behind the deflection mirror 21, and oscillates (swings) in two dimensions around the torsion bars 22 and 24. One or both of the oscillations in these two dimensions are due to resonance. Thus, a light beam incident on and reflected by this swinging deflection mirror 21 is deflected in two dimensions about (pivoting on) the deflection axes.

In the deflection device 16 of this embodiment, the deflection mirror 21 is set up such that it swings with a mechanical angle amplitude of ±5.5 deg in the direction within the paper plane in FIG. 1 (X direction) and ±4.13 deg in the direction perpendicular to the paper plane (Y direction), and moreover such that 80% of these overall amplitudes are used for the deflection of a light beam and 10% on either side of the amplitude remain blank.

As a numerical example of the scanning type display optical system according to the present embodiment, Table 1 shows the curvature radii of and spacings between the respective optical elements. The curvature radii and spacings are given in mm. Moreover, nd denotes the refractive index and vd denotes the Abbe number of the optical elements. This is also the same in the numerical examples described in the embodiments below.

The three lenses 17a, 17b and 17c of the scanning optical system 17 have negative, positive and positive optical power (inverse of the focal length), respectively. The second lens 17c is a positive meniscus lens, and its convex surface faces toward the deflection device 16.

TABLE 1

| element name | D1/D 0.645 ref. numeral | D2/D 0.123 surface number | curv. radius | spacing | nd | vd |
|---|---|---|---|---|---|---|
| converg. lens (pos.) | 13 | 1 | 22.63 | 3.00 | 1.516 | 64.1 |
|  |  | 2 | −18.26 | 0.00 |  |  |
| converg. lens (neg.) |  | 3 | −18.26 | 2.00 | 1.603 | 38.0 |
|  |  | 4 | −104.90 | 8.10 |  |  |
| half mirror | 14 | 5 | ∞ | 3.50 | 1.697 | 55.5 |
|  |  | 6 | ∞ | 3.50 |  |  |
|  |  | 7 | ∞ | 2.50 |  |  |
| protective glass | 15 | 8 | ∞ | 1.00 | 1.516 | 64.1 |
|  |  | 9 | ∞ | 5.00 |  |  |
| deflection mirror | 16 | 10 | ∞ | 5.00 |  |  |

TABLE 1-continued

| element name | D1/D 0.645 ref. numeral | D2/D 0.123 surface number | curv. radius | spacing | nd | vd |
|---|---|---|---|---|---|---|
| protective glass | 15 | 11 | ∞ | 1.00 | 1.516 | 64.1 |
|  |  | 12 | ∞ | 2.50 |  |  |
| half mirror | 14 | 13 | ∞ | 7.00 | 1.697 | 55.5 |
|  |  | 14 | ∞ | 2.00 |  |  |
| neg. lens | 17a | 15 | −6.95 | 1.00 | 1.669 | 31.1 |
|  |  | 16 | −68.46 | 1.40 |  |  |
| pos. lens 1 | 17b | 17 | −4.72 | 1.25 | 1.744 | 44.8 |
|  |  | 18 | −4.91 | 0.10 |  |  |
| pos. lens 2 | 17c | 19 | 11.05 | 2.54 | 1.639 | 55.4 |
|  |  | 20 | 25.00 | 3.35 |  |  |
| image plane | 18 |  | ∞ |  |  |  |

In this embodiment, of the scanning optical system 17, the first lens 17a, which is a negative lens, is arranged on the side closest to the deflection device 16, and the second lens 17c, which is a positive meniscus lens, is arranged on the side closest to the image plane 18, so that the scanning optical system 17 is provided with telecentricity while making the overall length of the optical system shorter.

Moreover, by combining a negative lens (17a) and a positive meniscus lens (17c), the scanning optical system 17 can be provided with the action of correcting curvature of field on the image plane 18. By letting the convex surface of the positive meniscus lens (17c) surface the deflection device 16, the scanning optical system 17 can be provided with the action of correcting distortion on the image plane 18.

Figure 3A:
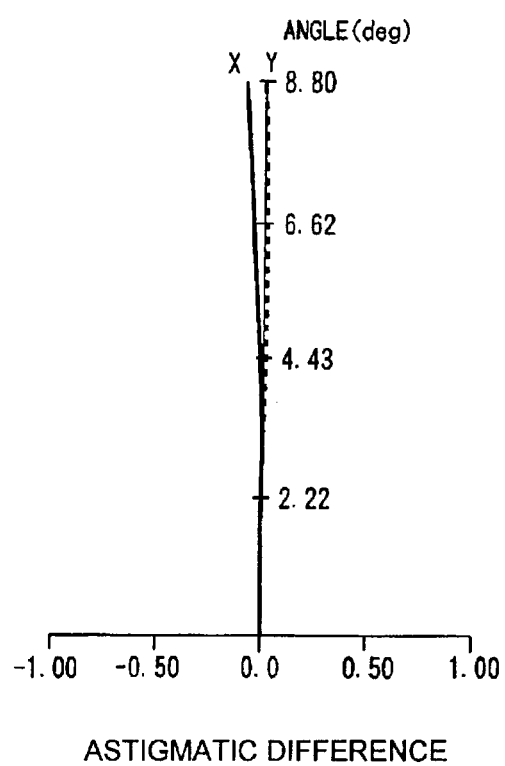
FIGS. 3A and 3B show aberration graphs of the scanning type optical system in Embodiment 1.
Figure 3B:
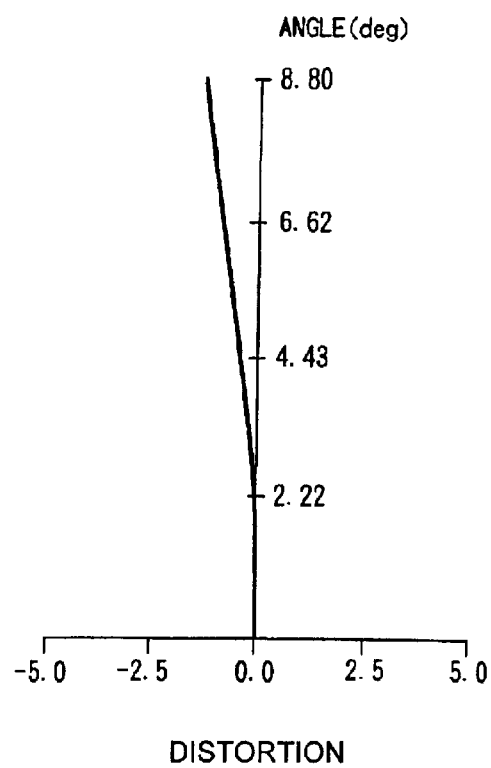

FIGS. 3A and 3B show aberration graphs of the present embodiment (numerical example). FIG. 3A shows the astigmatic difference (in mm) between the main scanning direction (direction within the paper plane of FIG. 1) and the secondary scanning direction (direction perpendicular to the paper plane of FIG. 1). FIG. 3B shows the change of the amount of distortion (in %) depending on the deflection angle in the main axis direction. In FIG. 3A, the solid line represents the main scanning direction, and the broken line represents the secondary scanning direction. It should be noted that the aberration graphs discussed in the following are also graphs showing the amounts of astigmatic difference and distortion, like FIGS. 3A and 3B. It can be seen from FIGS. 3A and 3B that astigmatic difference and distortion are favorably corrected by the scanning optical system 17 of the present embodiment.

Figure 4:
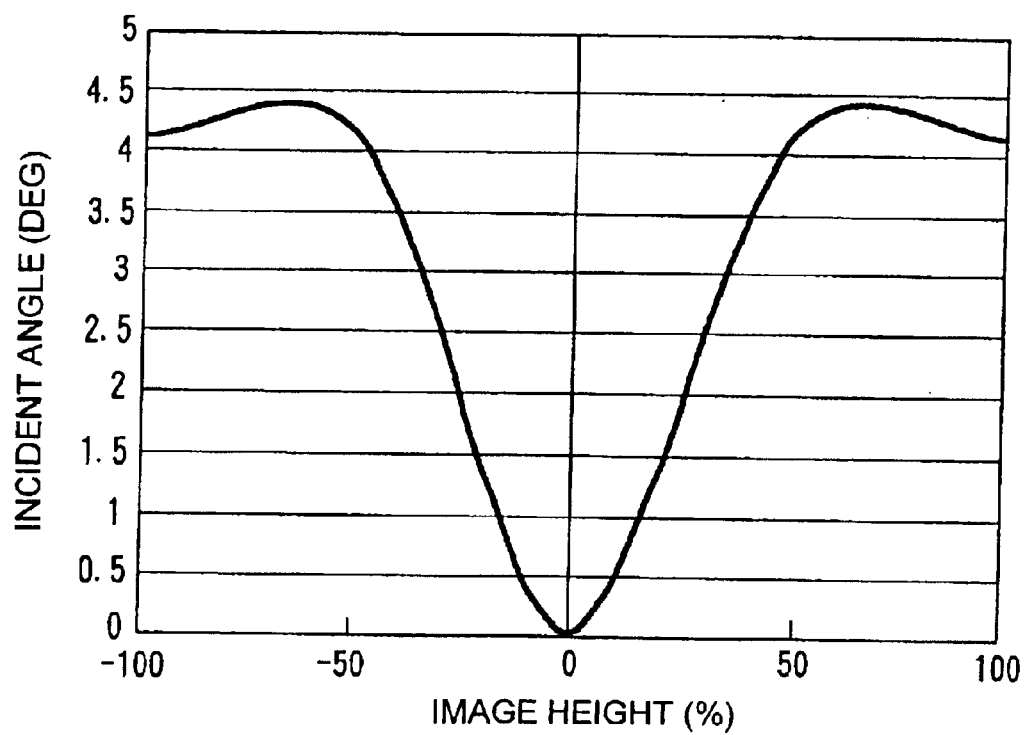
FIG. 4 illustrates the characteristics of the angle of incidence on the image plane of the scanning optical system Embodiment 1.

FIG. 4 illustrates the relation between the incident angle of the light beam onto the image plane 18 with the scanning optical system 17 of the present embodiment and the relative position (image height) in the image formed on the image plane 18. The horizontal axis denotes the image height (in %) and the vertical axis denotes the incident angle onto the image plane (in deg).

From FIG. 4, it can be seen that the scanning optical system 17 in the present embodiment has good telecentricity with incident angles on the image plane 18 of 5 deg or less. By having the telecentricity, a scanning optical system is attained, in which changes in the moving characteristics of the scanning spot and changes in the image plane size on the image plane 18 are small, even when the image plane 18 is out of focus.

The Abbe number v1 of the glass material of the negative lens (17a) is 31.1, the Abbe number v2 of the glass material of the positive meniscus lens (17c) is 55.4, that is:

$$v1 < v2$$

With this relation between the Abbe numbers, the scanning optical system 17 can be provided with the action of correcting chromatic aberration if light with a plurality of different wavelengths is emitted from the light source 11.

Figure 5:
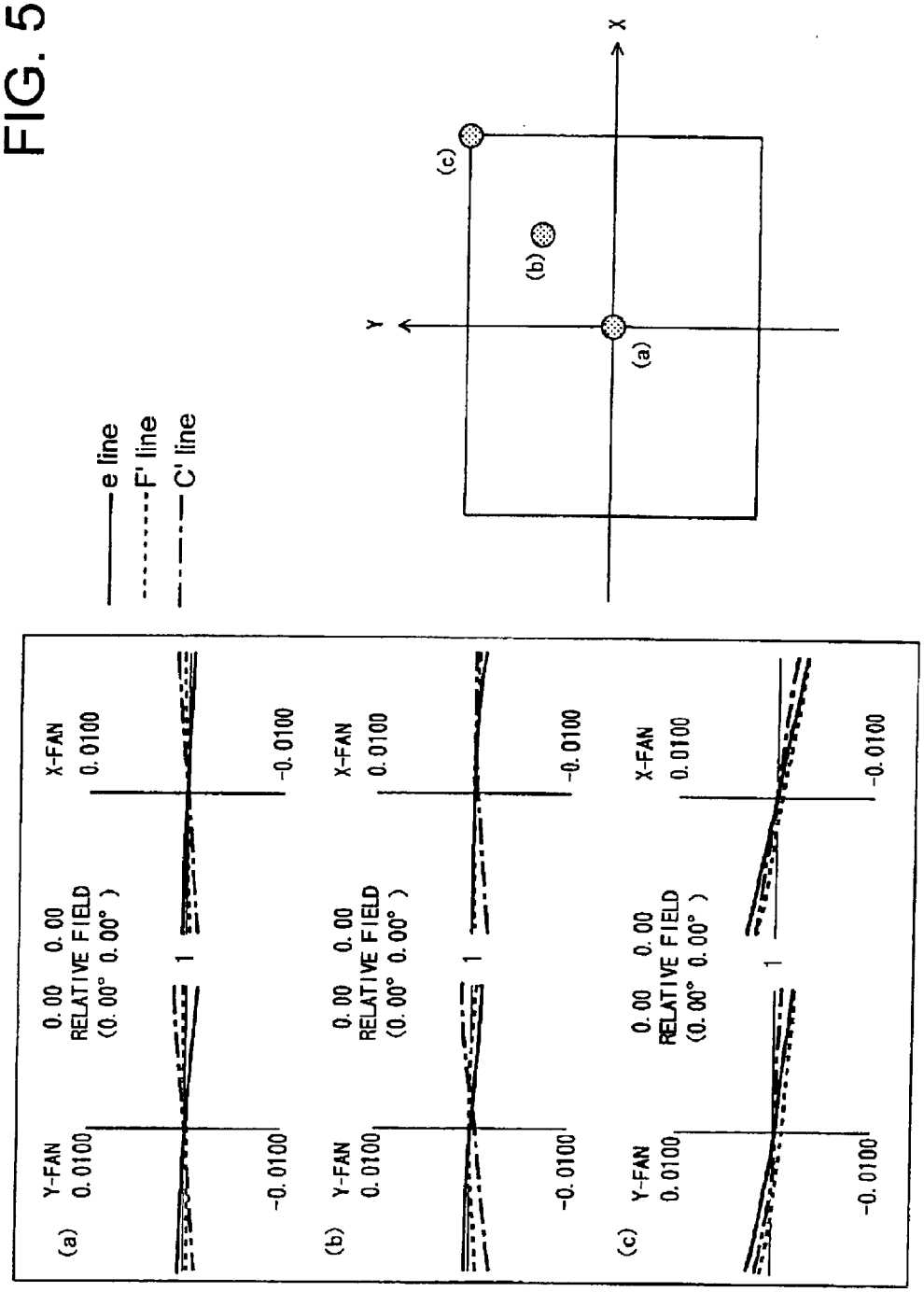
FIG. 5 shows lateral aberration graphs of the scanning type optical system in Embodiment 1.

FIG. 5 shows lateral aberration graphs for the case that F' line (wavelength: 479.99 nm), e line (wavelength: 546.07 nm), and C' line (wavelength: 643.85 nm) is given as the light from the light source 11 in this embodiment.

In FIG. 5, the graph (a) shows a lateral aberration graph at the image center on the image plane 18, the graph (b) at a position of 50% of the image height, and the graph (c) at a position of 100% of the image height. In FIG. 5, the solid line denotes the e line, the dash-dotted line denotes the C' line and the broken line denotes the F' line. From FIG. 5, it can be seen that the scanning optical system 17 performs a favorable correction of chromatic aberration when light with a plurality of different wavelengths is emitted from the light source 11. Furthermore, if the light from the light source 11 has a single wavelength, then the effect is attained that there is hardly any change in the performance of the scanning optical system 17 even when the wavelength of the light source 11 changes.

In addition to the scanning optical system 17, the present embodiment also has the converging lens 13 as an optical system guiding a light beam to the deflection device 16. By letting converging light beam be incident on the deflection device 16, optical power can be split between the converging lens 13 and the scanning optical system 17. Thus, the scanning optical system 17 can be configured as appropriate for correcting distortion and astigmatic difference.

In the present embodiment, a half mirror 14 is arranged on the optical path between the converting lens 13 and the deflection device 16. By inserting this half mirror 14, the optical system directing the light beam 12 from the light source 11 to the deflection device 16 can be made compact. Moreover, the light beam 12 is made to be incident perpendicularly (to the two deflection axes) into the deflection device 16.

Moreover, in the present embodiment:

$$D1/D = 0.645$$

wherein D is the distance from the deflection device 16 to the image plane 18 of the scanning optical system 17, and D1 is the distance from the deflection device 16 to the first surface (incident surface) of the lens (negative lens) 17a, as shown in FIG. 1.

If D1/D is lower than 0.4, then the degree of freedom in the optical system guiding the light beam 12 from the light source 11 is compromised. If D1/D is greater than 0.8, then the overall two-dimensional scanning device including the scanning optical system 17 becomes large. Thus, it is preferable that:

$$0.4 \leq D1/D \leq 0.8 \quad (A)$$

Moreover, in the present embodiment:

$$D2/D = 0.123$$

wherein D2 is the distance from the second surface (emergent surface) of the second lens (positive meniscus lens) 17c to the image plane 18.

If D2/D is lower than 0.05, then it becomes difficult to arrange the scanned object (such as a screen) on the image plane 18. If D2/D is greater than 0.3, then the overall two-dimensional scanning device including the scanning optical system 17 becomes large. Thus, it is preferable that:

$$0.05 \leq D2/D \leq 0.3 \quad (B)$$

Embodiment 2

Figure 6:
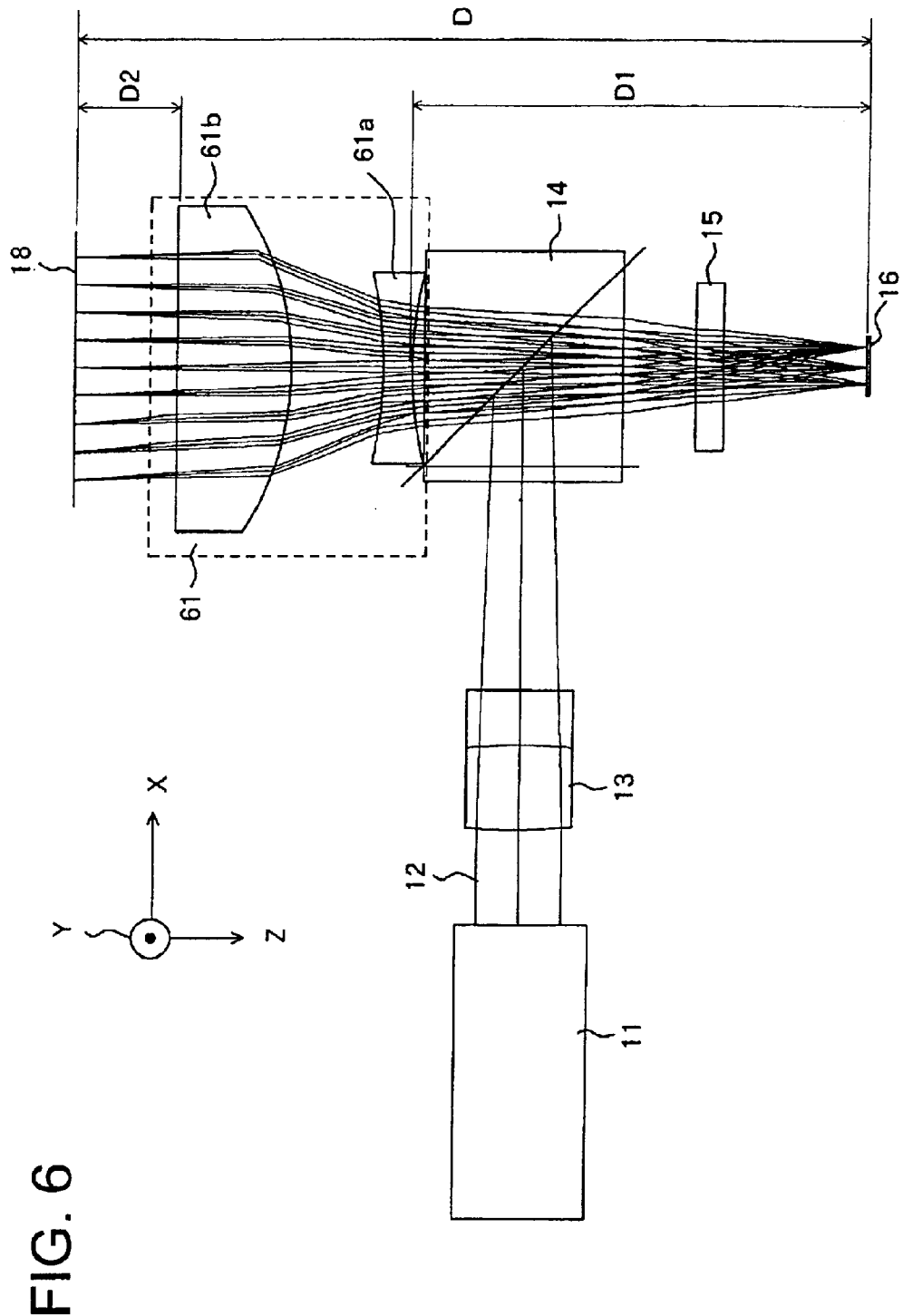
FIG. 6 shows a vertical sectional view of a scanning type display optical system according to Embodiment 2 of the present invention.

FIG. 6 shows a vertical section of a scanning type display optical system according to Embodiment 2 of the present invention. In this embodiment, structural elements that are the same as in Embodiment 1 have been assigned the same numerals as in Embodiment 1 and their further explanation is omitted. Also in the following embodiments, structural elements that are the same as in Embodiment 1 are assigned the same numerals as in Embodiment 1 and their further explanation is omitted.

In the present embodiment, the number of lenses constituting the scanning optical system (image-forming optical system) 61 is reduced from the Embodiment 1 to two lenses, namely a first lens 61a, which is a negative lens, and a second lens 61b, which is a positive meniscus lens.

By configuring the scanning optical system 61 with two lenses, it is possible to reduce the costs for the scanning optical system 61. Moreover, in this embodiment, the deflection mirror of the deflection device 16 is set up such that it swings with a mechanical angle amplitude of ±5.5 deg in the direction within the paper plane in FIG. 6 (X direction) and ±4.13 deg in the direction perpendicular to the paper plane (Y direction), and moreover such that 80% of these overall amplitudes are used for the deflection of a light beam and 10% on either side of the amplitude remain blank.

As a numerical example of the scanning display optical system according to the present embodiment, Table 2 shows the curvature radii of and spacings between the respective optical elements.

TABLE 2

| element name | ref. numeral | surface number | curv. radius | spacing | nd | vd |
|---|---|---|---|---|---|---|
| | D1/D 0.601 | D2/D 0.120 | | | | |
| converg. lens (pos.) | 13 | 1 | 13.32 | 2.67 | 1.516 | 64.1 |
| | | 2 | −45.20 | 0.00 | | |
| converg. lens (neg.) | | 3 | −45.20 | 2.00 | 1.603 | 38.0 |
| | | 4 | 37.27 | 8.10 | | |
| half mirror | 14 | 5 | ∞ | 3.50 | 1.697 | 55.5 |
| | | 6 | ∞ | 3.50 | | |
| | | 7 | ∞ | 2.50 | | |
| protective glass | 15 | 8 | ∞ | 1.00 | 1.516 | 64.1 |
| | | 9 | ∞ | 5.00 | | |
| deflection mirror | 16 | 10 | ∞ | 5.00 | | |
| protective glass | 15 | 11 | ∞ | 1.00 | 1.516 | 64.1 |
| | | 12 | ∞ | 2.50 | | |
| half mirror | 14 | 13 | ∞ | 7.00 | 1.697 | 55.5 |
| | | 14 | ∞ | 1.00 | | |
| neg. lens | 61a | 15 | −11.12 | 1.08 | 1.689 | 31.1 |
| | | 16 | 13.25 | 2.57 | | |
| pos. lens | 61b | 17 | 10.09 | 4.00 | 1.834 | 37.2 |
| | | 18 | 3481.96 | 3.30 | | |
| image plane | 18 | | ∞ | | | |

Also in this embodiment, as in Embodiment 1, the negative lens (61a) is arranged on the side of the deflection device 16 and the positive meniscus lens (61b) is arranged on the side of the image plane 18. With this arrangement, the scanning optical system 61 is provided with telecentricity, and curvature of field can be reduced. Moreover, the convex surface of the positive meniscus lens (61b) faces toward the deflection device 16, so that distortion on the image plane 18 can be corrected.

FIGS. 7A and 7B show aberration graphs of the present embodiment (numerical example). From FIGS. 7A and 7B, it can be seen that a favorable aberration correction is also performed in this embodiment.

Figure 8:
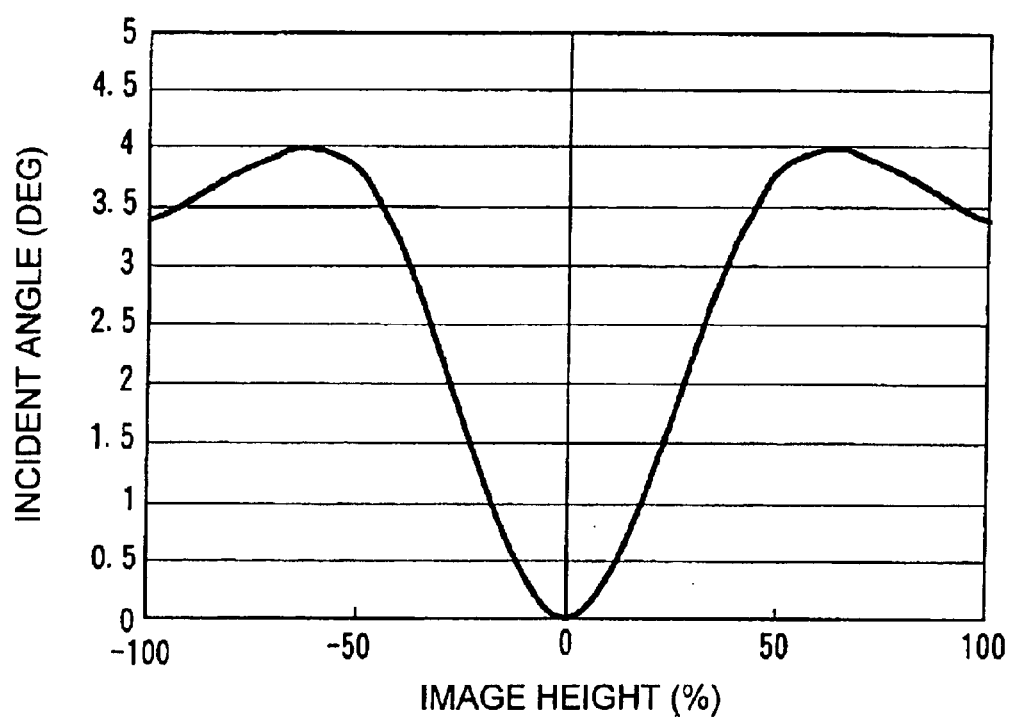
FIG. 8 illustrates the characteristics of the incident angle on the image plane of the scanning type optical system in Embodiment 2.

FIG. 8 shows the relation between image height and incident angle onto the image plane 18. It can be seen that also in this embodiment, the largest incident angle onto the image plane 18 with the scanning optical system 61 is small at 5 deg or less, and the scanning optical system 61 has good telecentricity. By having the telecentricity, a scanning optical system 61 is attained, in which changes in the moving characteristics of the scanning spot and changes in the image plane size on the image plane 18 due to defocusing are small.

The Abbe number v1 of the glass material of the negative lens (61a) is 31.1, the Abbe number v2 of the glass material of the positive meniscus lens (61b) is 37.2, that is:

$$v1 < v2$$

With this relation between the Abbe numbers, the scanning optical system 61 can be provided with the action of correcting chromatic aberration if light with a plurality of different wavelengths is emitted from the light source 11.

Figure 9:
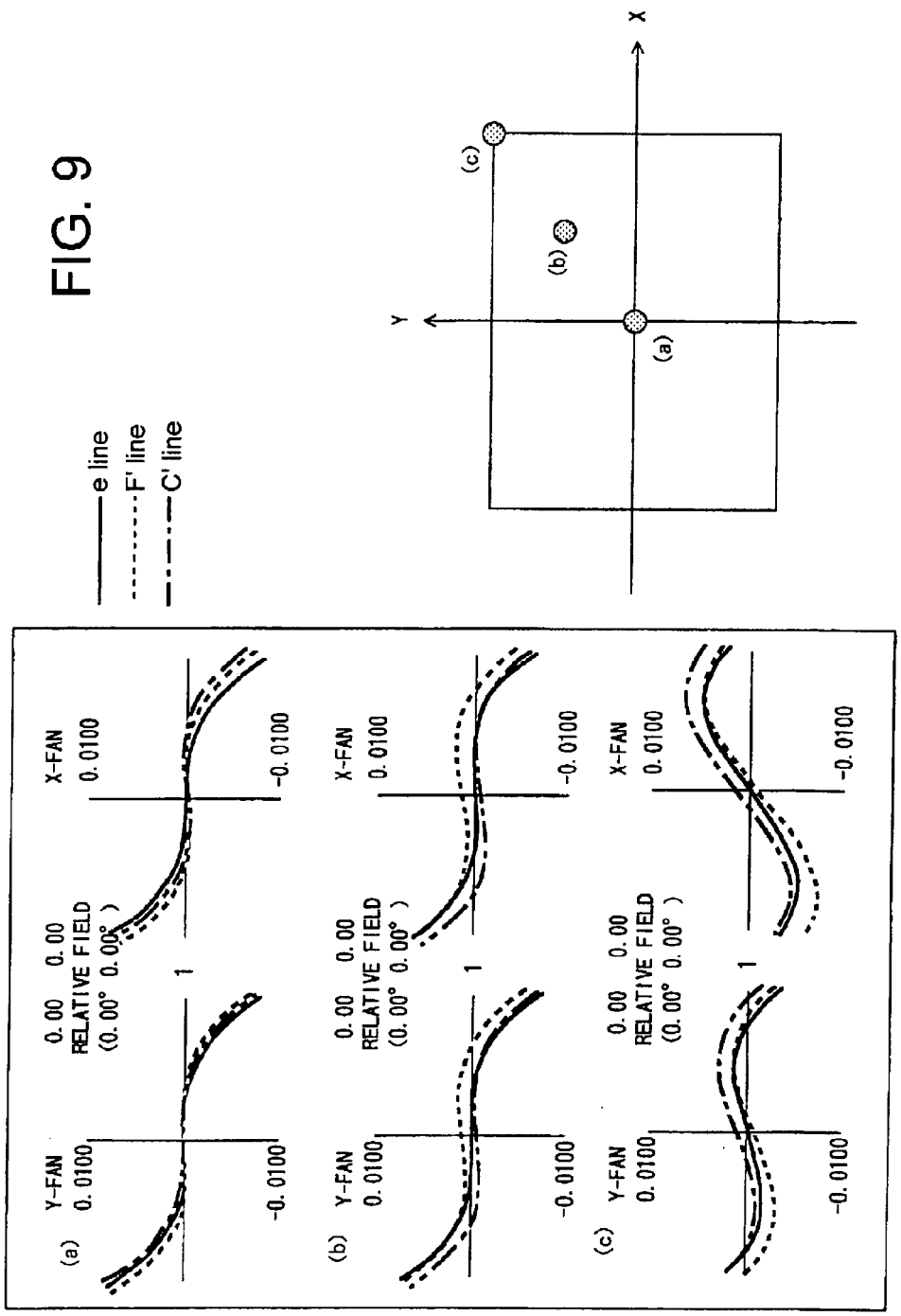
FIG. 9 shows lateral aberration graphs of the scanning optical system in Embodiment 2.

FIG. 9 shows lateral aberration graphs for the case that F' line, e line, and C' line is given as the light from the light source 11 in this embodiment.

In FIG. 9, the graph (a) shows a lateral aberration at the image center on the image plane 18, the graph (b) at a position of 50% of the image height, and the graph (c) at a position of 100% of the image height. In FIG. 9, the solid line denotes the e line, the dash-dotted line denotes the C' line and the broken line denotes the F' line.

From FIG. 9, it can be seen that the scanning optical system 61 performs a favorable correction of chromatic aberration when light with a plurality of different wavelengths is emitted from the light source 11. Furthermore, if the light from the light source 11 has a single wavelength, then the effect is attained that there is hardly any change in the performance of the scanning optical system 61 even when the wavelength of the light source 11 changes.

Also in this embodiment, $$D1/D = 0.601, \text{ and}$$

$$D2/D = 0.120$$

holds, so that the conditional expressions (A) and (B) given above are satisfied.

Embodiment 3

Figure 10:
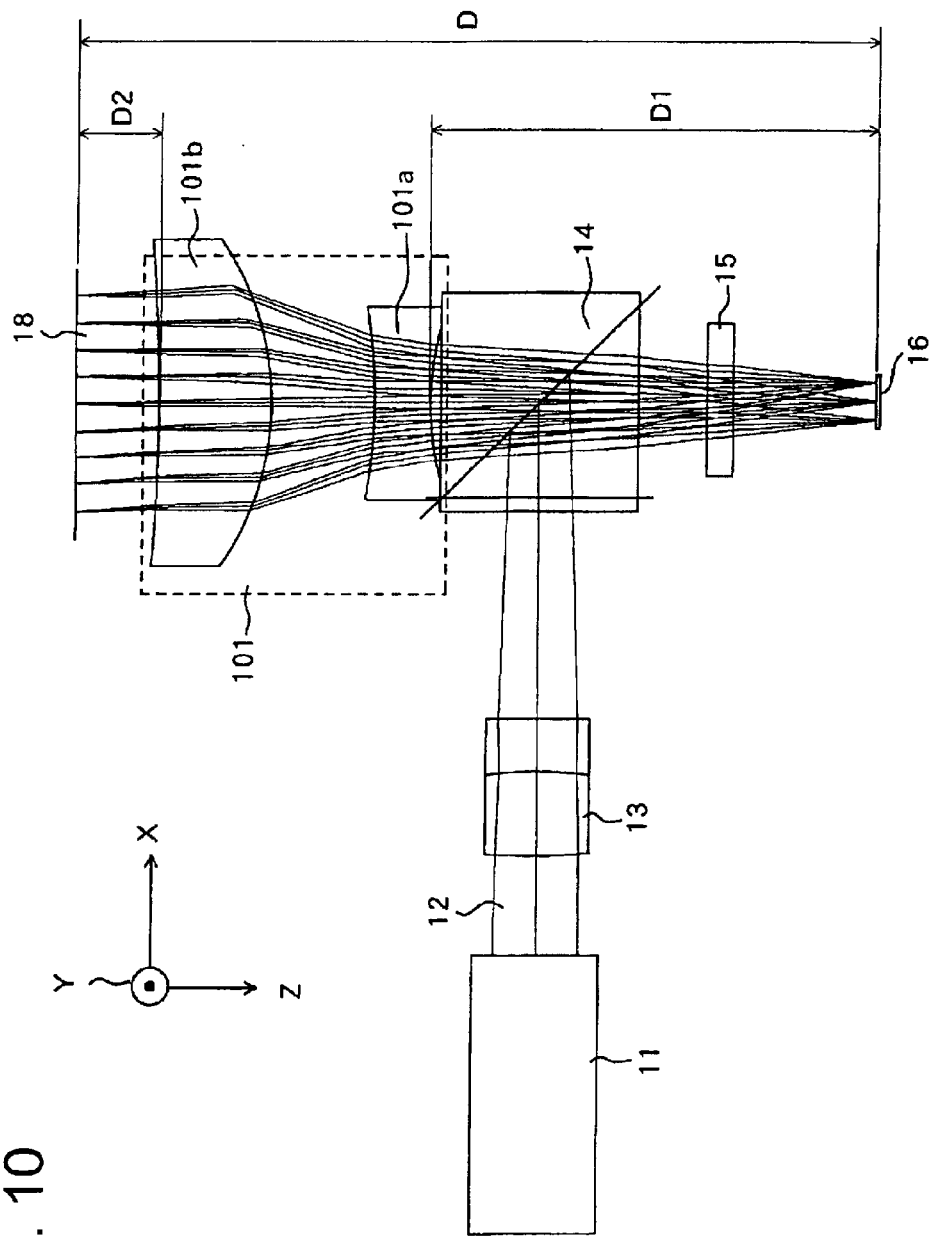
FIG. 10 shows a vertical sectional view of a scanning type display optical system according to Embodiment 3 of the present invention.

FIG. 10 shows a vertical section of a scanning type display optical system according to Embodiment 3 of the present invention. Also in this embodiment, as in Embodiment 2, the scanning optical system 101 is configured by two lenses, namely a first lens 101a, which is a negative lens, and a second lens 101b, which is a positive meniscus lens, and the astigmatic difference is corrected by introducing a rotation symmetric aspheric surface as the convex second surface (incident surface: surface No. 17 in Table 3) of the positive meniscus lens (101b). The rotation symmetric aspheric surface can be expressed by the following Expression 1:

$$Z(r) = \frac{cr^2}{1 + \sqrt{1 - (1+k)c^2 r^2}} + Ar^4 + Br^6 + Cr^8 + Dr^{10} \quad \text{(Expression 1)}$$

wherein z is the sag of the surface parallel to the z-axis, $r^2 = x^2 + y^2$, c is the curvature, k is the conic coefficient, and A to D are the aspheric surface coefficients (of even order).

Moreover, in the present embodiment, as in Embodiment 2, the deflection mirror of the deflection device 16 is set up such that it swings with a mechanical angle amplitude of ±5.5 deg in the direction within the paper plane in FIG. 10 (X direction) and ±4.13 deg in the direction perpendicular to the paper plane (Y direction), and moreover such that 80% of these amplitudes are used for the deflection of light beam and 10% on either side of the amplitude remain blank.

As a numerical example of the scanning type display optical system according to the present embodiment, Table 3 shows the curvature radii of and spacings between the respective optical elements. In Table 3, the aspheric surface coefficients (K, A, B, C and D) for surface 17 are also given.

TABLE 3

| element name | D1/D 0.619 ref. nu- meral | D2/D 0.116 surface number | curv. radius | spacing | nd | vd |
|---|---|---|---|---|---|---|
| con- verg. lens (pos.) | 13 | 1 | 23.25 | 3.00 | 1.516 | 64.1 |
|  |  | 2 | −19.06 | 0.00 |  |  |
| con- verg. lens (neg.) |  | 3 | −19.06 | 2.00 | 1.603 | 38.0 |
|  |  | 4 | −96.62 | 8.10 |  |  |
| half mirror | 14 | 5 | ∞ | 3.50 | 1.697 | 55.5 |
|  |  | 6 | ∞ | 3.50 |  |  |
|  |  | 7 | ∞ | 2.50 |  |  |
| protec- tive glass | 15 | 8 | ∞ | 1.00 | 1.516 | 64.1 |
|  |  | 9 | ∞ | 5.00 |  |  |
| deflec- tion mirror | 16 | 10 | ∞ | 5.00 |  |  |
| protec- tive glass | 15 | 11 | ∞ | 1.00 | 1.516 | 64.1 |
|  |  | 12 | ∞ | 2.50 |  |  |
| half mirror | 14 | 13 | ∞ | 7.00 | 1.697 | 55.5 |
|  |  | 14 | ∞ | 0.40 |  |  |
| neg. lens | 101a | 15 | −13.61 | 2.00 | 1.689 | 31.1 |
|  |  | 16 | 18.72 | 3.77 |  |  |
| pos. lens | 101b | 17 | 11.39 | 4.00 | 1.834 | 37.2 |
|  |  | K | A | B |  |  |
|  |  | 0.000E+00 | −1.283E−05 | 4.273E−06 |  |  |
|  |  | C | D |  |  |  |
|  |  | −8.416E−08 | 8.354E−10 |  |  |  |
|  |  | 18 | 73.52 | 2.97 |  |  |
| image plane | 18 |  | ∞ |  |  |  |

Figure 11A:
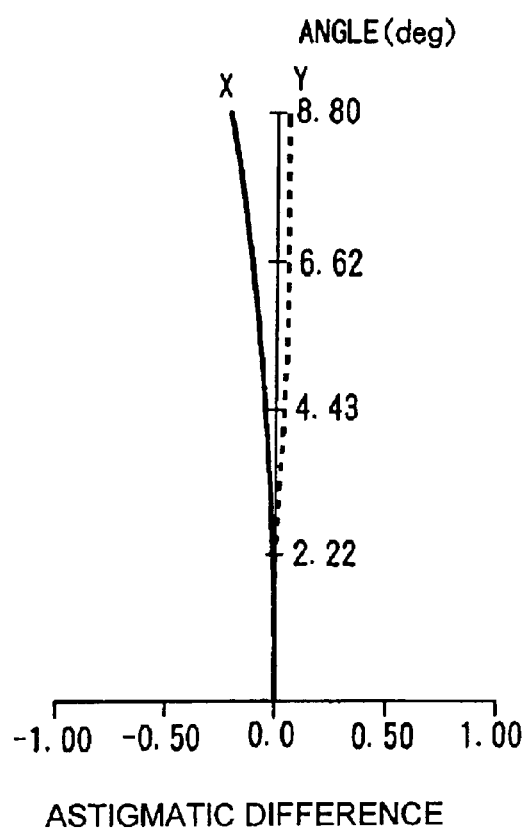
FIGS. 11A and 11B show aberration graphs of the scanning type optical system in Embodiment 3.
Figure 11B:
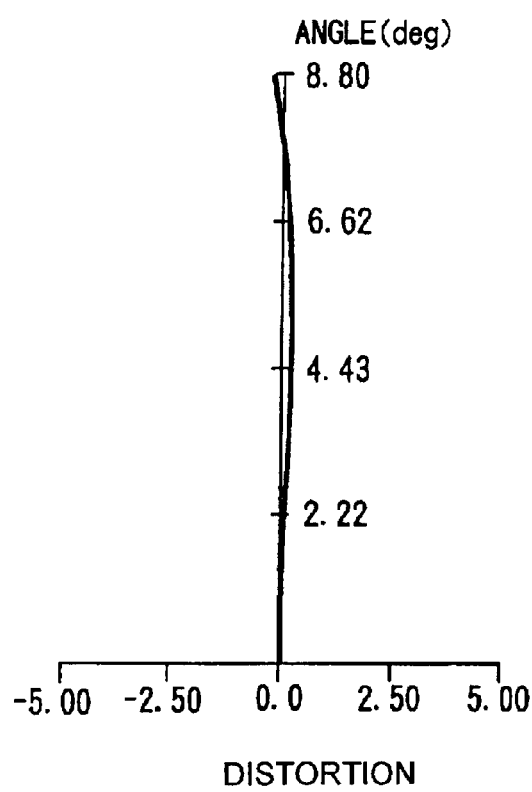
Figure 12:
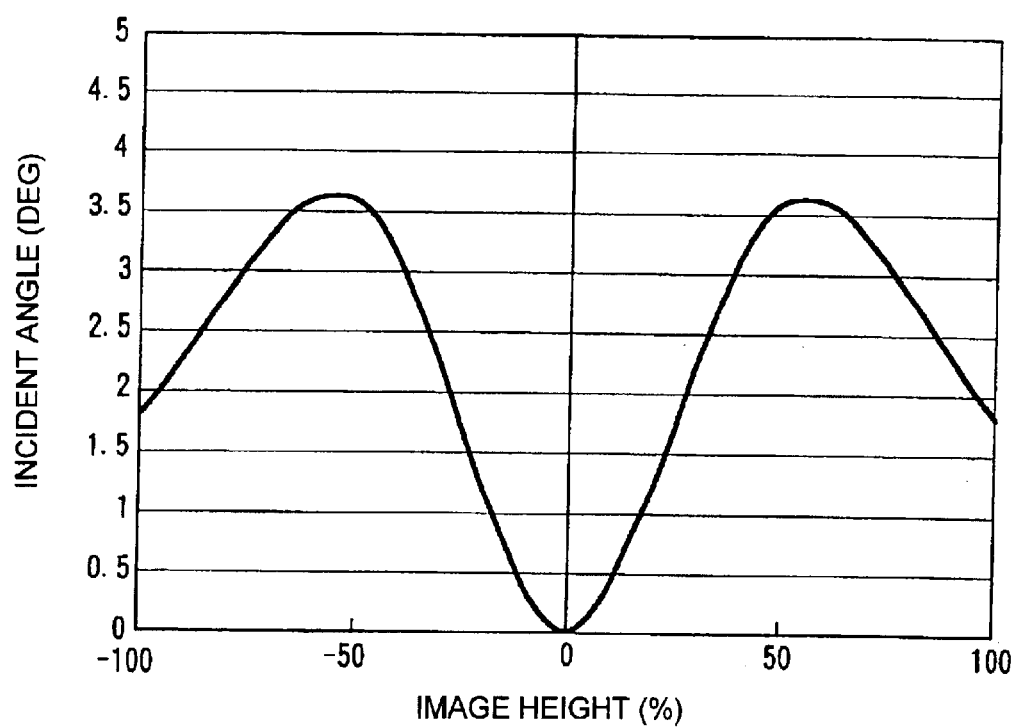
FIG. 12 illustrates the characteristics of the incident angle on the image plane of the scanning type optical system in Embodiment 3.

Moreover, FIGS. 11A and 11B show aberration graphs of the present embodiment (numerical example). By introducing a rotation-symmetric aspheric surface in the scanning optical system 101, the scanning optical system 101 can effectively perform a correction of astigmatism and curvature of field while having telecentricity as a whole. For this reason, the amount of astigmatic difference in the present embodiment is smaller than in Embodiment 2, while a telecentricity with incident angles on the image plane 18 of 5.0 deg or less (see FIG. 12) is maintained. By having the telecentricity, a scanning optical system is attained, in which changes in the moving characteristics of the scanning spot and changes in the image plane size on the image plane 18 are small, even when the image plane 18 is out of focus.

The Abbe number v1 of the glass material of the negative lens (101*a*) is 31.1, and the Abbe number v2 of the glass material of the positive meniscus lens (101*b*) is 37.2, that is:

$$v1 < v2$$

Figure 13:
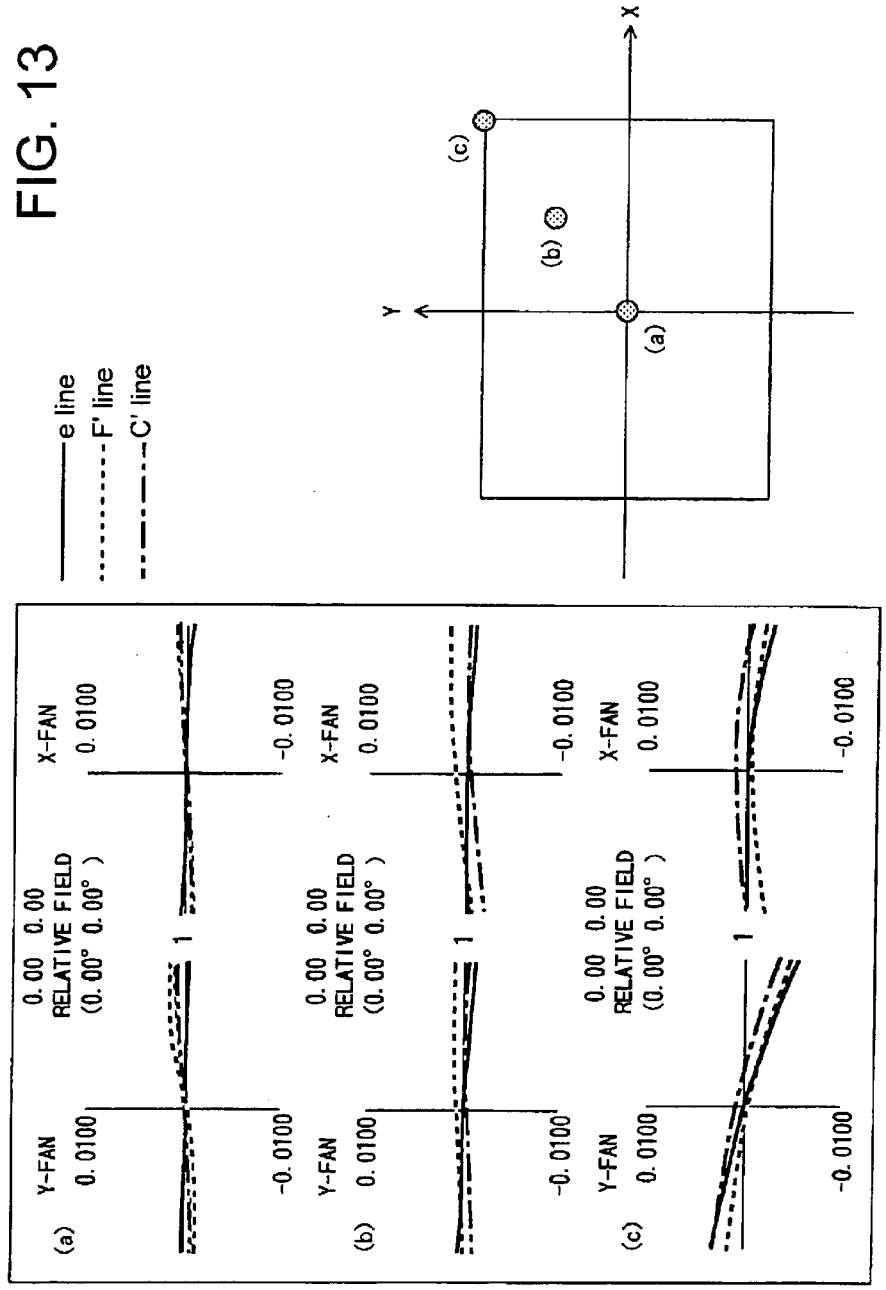
FIG. 13 shows lateral aberration graphs of the scanning type optical system in Embodiment 3.

With this relation between the Abbe numbers, the action of correcting chromatic aberration if light with a plurality of different wavelengths is emitted from the light source 11, can be provided. FIG. 13 shows lateral aberration graphs for the case that F' line t, e line, and C' line is given as the light from the light source 11 in this embodiment. In FIG. 13, the graph (a) shows a lateral aberration at the image center on the image plane 18, the graph (b) at a position of 50% of the image height, and the graph (c) at a position of 100% of the image height. In FIG. 13, the solid line denotes thee line, the dash-dotted line denotes the C' line and the broken line denotes the F' line.

From FIG. 13, it can be seen that the scanning optical system 101 performs a favorable correction of chromatic aberration when light with a plurality of different wavelengths is emitted from the light source 11. Furthermore, if the light from the light source 11 has a single wavelength, then the effect is attained that there is hardly any change in the performance of the scanning optical system 101 even when the wavelength of the light source 11 changes.

Thus, with the present embodiment, by arranging a lens (first lens 101*a*) with negative power closest to the deflection device 16 and arranging a lens (second lens 101*b*) with positive power closest to the image plane 18 in the scanning optical system 101, it is possible to construct a telecentric scanning optical system in which curvature of field is corrected. Moreover, by making the positive lens (101*b*) a positive meniscus lens whose convex surface faces the deflection device 16, a scanning optical system can be constructed in which distortion is corrected.

Also in this embodiment, $$D1/D = 0.619, \text{ and}$$

$$D2/D = 0.116,$$

so that the above-noted conditional expressions (A) and (B) are satisfied.

It should be noted that in the above-explained Embodiments 1 to 3, the scanning optical system is constructed by arranging either no or one lens between the negative lens on the side of the deflection device 16 and the positive meniscus lens on the side of the image plane 18, but there is no limitation to the number of lenses that are inserted between the negative lens and the positive meniscus lens, and it is also possible to insert two or more lenses.

Moreover, in Embodiments 1 to 3, a half-mirror is used as a reflective surface guiding the converging light beam to the deflection device, but there is no limitation to the reflective surface. For example, it is also possible to arrange a polarization beam splitter that separates polarized light as the reflective surface, and using it together with a wavelength plate.

As explained above, with the Embodiments 1 to 3, curvature of field can be corrected and the scanning optical system can be provided with telecentricity, by arranging in the scanning optical system a negative lens and a positive lens. Consequently, changes in the moving characteristics of the scanning spot and changes in the image plane size on the image plane, caused by defocusing due to the light beam deflection, can be made small. Moreover, by making the positive lens a meniscus lens whose convex surface faces the deflection device, distortion can be favorably corrected. Consequently, a scanning type display optical system can be realized, in which an image of high quality can be observed.

Here, by making the incident angles of the light beam on the image plane of the scanning optical system 5° or less, the scanning optical system can be constructed as a substantially telecentric optical system, in which changes in the moving characteristics of the scanning spot and changes in the image plane size on the image plane can be made small, even when the image plane is out of focus.

It is also possible to arrange a converging optical element converting the light beam from the light source into converging light beam between the light source and the scanning optical system. Thus, the optical power can be split between the converging optical system and the scanning optical system, and the scanning optical system can be configured as appropriate for correcting distortion and astigmatic difference.

Furthermore a reflective surface guiding the light beam from the light source to the deflection device such that the light beam is incident from a direction oblique with respect to the deflection axes, is arranged between the light source and deflection device or between the converging optical element and the deflection device. Thus, it is possible to construct an optical system directing the light beam from the light source to the deflection device and to increase the degree of freedom for arranging the light source.

Furthermore, by satisfying $$v1 < v2,$$

it is possible to attain the effect that chromatic aberration is corrected in particular if a plurality of colored light rays of different wavelengths is emitted by the light source.

By satisfying Expression (A), it is possible to construct a scanning optical system that is small in size and that has a high degree of freedom with regard to an optical system directing of the light beam from the light source to the deflection device.

By satisfying Expression (B), it is possible to construct a scanning optical system that is small in size and with which a scanned object can be arranged easily on the image plane.

Embodiment 4

Figure 14:
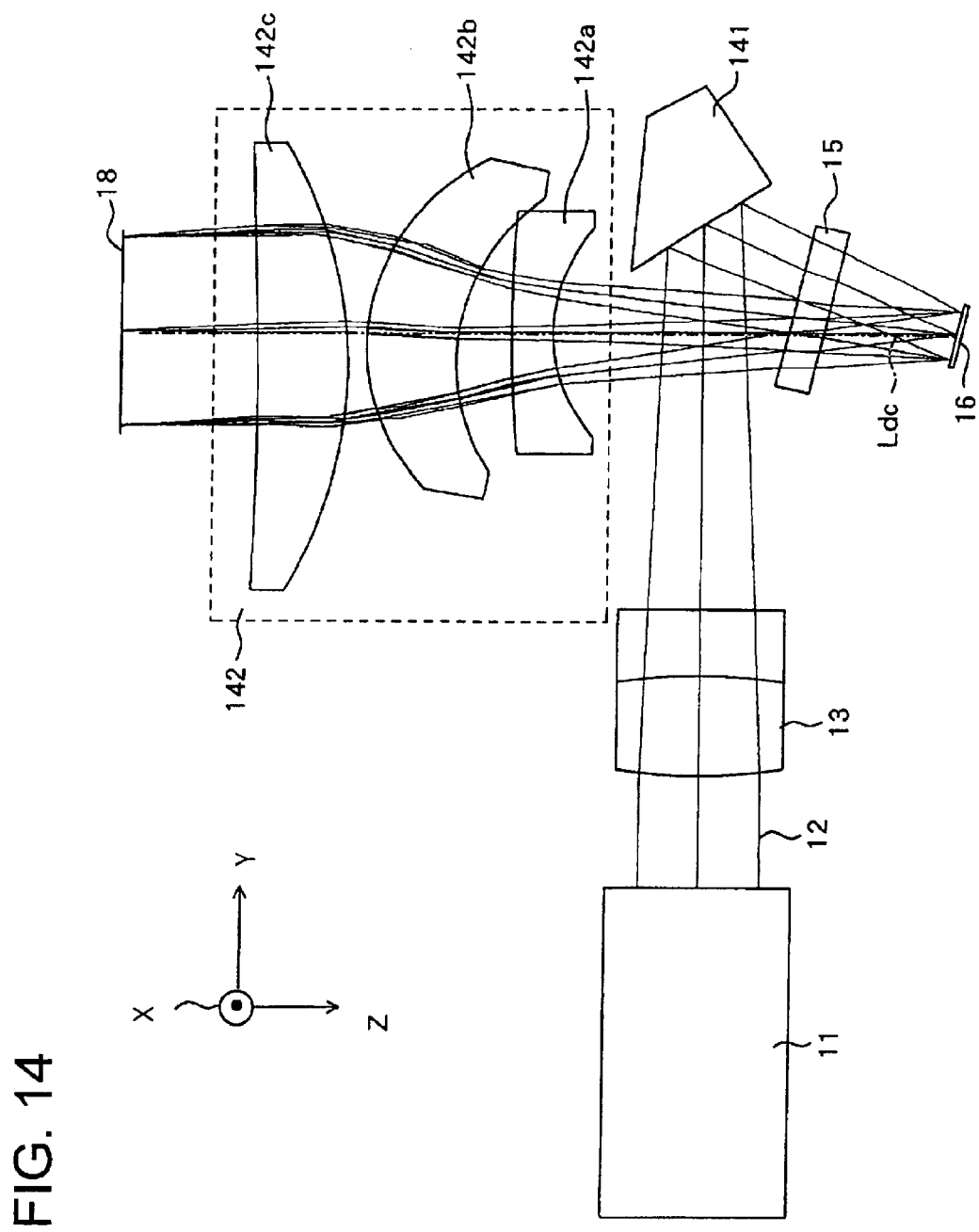
FIG. 14 shows a vertical sectional view of a scanning type display optical system according to Embodiment 4 of the present invention.

FIG. 14 shows a vertical section of a scanning type display optical system according to Embodiment 4 of the present invention. In this embodiment, distortion of the image frame (TV distortion) is corrected by letting the light beam from the light source 11 be obliquely incident (from a direction that is oblique with respect to the deflection axis of the deflection mirror that extends in the direction within the paper plane in FIG. 14) on the deflection device 16.

The light beam (parallel light rays) 12 from the light source 11 is converted by the converging lens 13 into converging light beam, the optical path is bent by a reflective surface (mirror) 141, and after passing through the protective glass 15, the light beam is incident on the deflection device 16. The deflection device 16 uses a MEMS device that can deflect and scan the light beam in two dimensions, like in Embodiment 1. The light beam 12 is deflected in two dimensions by the deflection device 16. After the deflected light beam has passed again through the protective glass 15, it is incident on a scanning optical system 142.

The scanning optical system 142 comprises a first lens 142*a*, a second lens 142*c* and a third lens 142*b*, which are optical elements. The first lens 142*a*, which is a negative lens, is arranged on the side closest to the deflection device 16. The second lens 142*c*, which is a positive meniscus lens, is arranged on the side closest to the image plane 18. The third lens 142b, which is a positive lens, is arranged between the first lens 142a and the second lens 142c.

The light beam 12 that have passed through the scanning optical system 142 form an image on the image plane 18. For this, the spot image on the image plane 18 of the light beam deflected in two dimensions by the deflection device 16 is scanned in two dimensions, and a two-dimensional image is formed on the image plane 18.

In this embodiment (and in the following embodiments), the axis through the center of the negative lens (first lens) of the scanning optical system, that is, the central axis Ldc of the two-dimensional deflection range due to the deflection device 16 is defined as the optical axis of the scanning optical system. In the present embodiment, in a section including the optical axis (central axis of the two-dimensional deflection range) Ldc of the scanning optical system and the optical axis of the light beam incident on the deflection device 16 (in FIG. 14, this section is an YZ section, and is referred to in the following as "section of incidence on the deflection device 16'''", the second lens 142c and the third lens 142b are tilted and shifted with respect to the optical axis Ldc of the scanning optical system.

Table 4 shows curvature radius, spacing, tilt amount and shift amount of the respective optical elements in a numerical example according to the present embodiment. The tilt amount and the shift amount indicate the amounts of inclination and displacement with respect to the optical axis Ldc of the scanning optical system in the section of incidence on the deflection device 16.

Moreover, in the present embodiment, the deflection mirror of the deflection device 16 is set up such that it swings with a mechanical angle amplitude of ±4.13 deg in the direction within the paper plane in FIG. 14 (Y direction) and ±5.5 deg in the direction perpendicular to the paper plane (X direction), and moreover such that 80% of the amplitudes are used for the deflection of light beam and 10% on either side of the amplitude remain blank.

TABLE 4

| element name | ref. numeral | surface number | curv. radius | spacing | nd | vd |
|---|---|---|---|---|---|---|
| converg. lens (pos.) | 13 | 1 | 15.51 | 3.00 | 1.516 | 64.1 |
| | | 2 | −24.53 | 0.00 | | |
| converg. lens (neg.) | | 3 | −24.53 | 2.00 | 1.603 | 38.0 |
| | | 4 | 104.06 | 11.72 | | |
| mirror | 141 | 5 | ∞ | 3.24 | | |
| protective glass | 15 | 6 | ∞ | 1.00 | 1.516 | 64.1 |
| | | 7 | ∞ | 4.00 | | |
| deflection mirror | 16 | 8 | ∞ | 4.00 | | |
| protective glass | 15 | 9 | ∞ | 1.00 | 1.516 | 64.1 |
| | | 10 | ∞ | 7.00 | | |
| neg. lens | 142a | 11 | −4.78 | 1.20 | 1.593 | 35.3 |
| | | 12 | −37.31 | 1.54 | | |
| second pos. lens | 142b | 13 | −6.15 | 2.71 | 1.835 | 42.7 |
| | | 14 | −6.25 | 0.66 | | |
| | | | inclin. −10.63 | shift −0.25 | | |
| pos. meniscus lens | 142c | 15 | 13.38 | 2.68 | 1.741 | 52.6 |
| | | 16 | 108.43 | 4.00 | | |
| | | | shift 0.99 | | | |
| image plane | 18 | | ∞ | | | |

In the present embodiment, the light beam 12 from the light source 11, which has been converted into converging light beam by the converging lens 13, is incident on the deflection device 16 at an inclination of 12.5 deg with respect to the normal on the deflection axis of the deflection device 16 in the middle position (non-oscillating state) that extends in the direction within the paper plane of FIG. 14 (that is, the deflection axis when the light beam is deflected in a direction perpendicular to the paper plane) within the section of incidence on the deflection device 16.

If the light beam 12 is incident on the deflection device 16 in this manner at a direction oblique with respect to this deflection axis, then this causes a large TV distortion and trapezoidal distortion in the image formed on the image plane 18.

Figure 15:
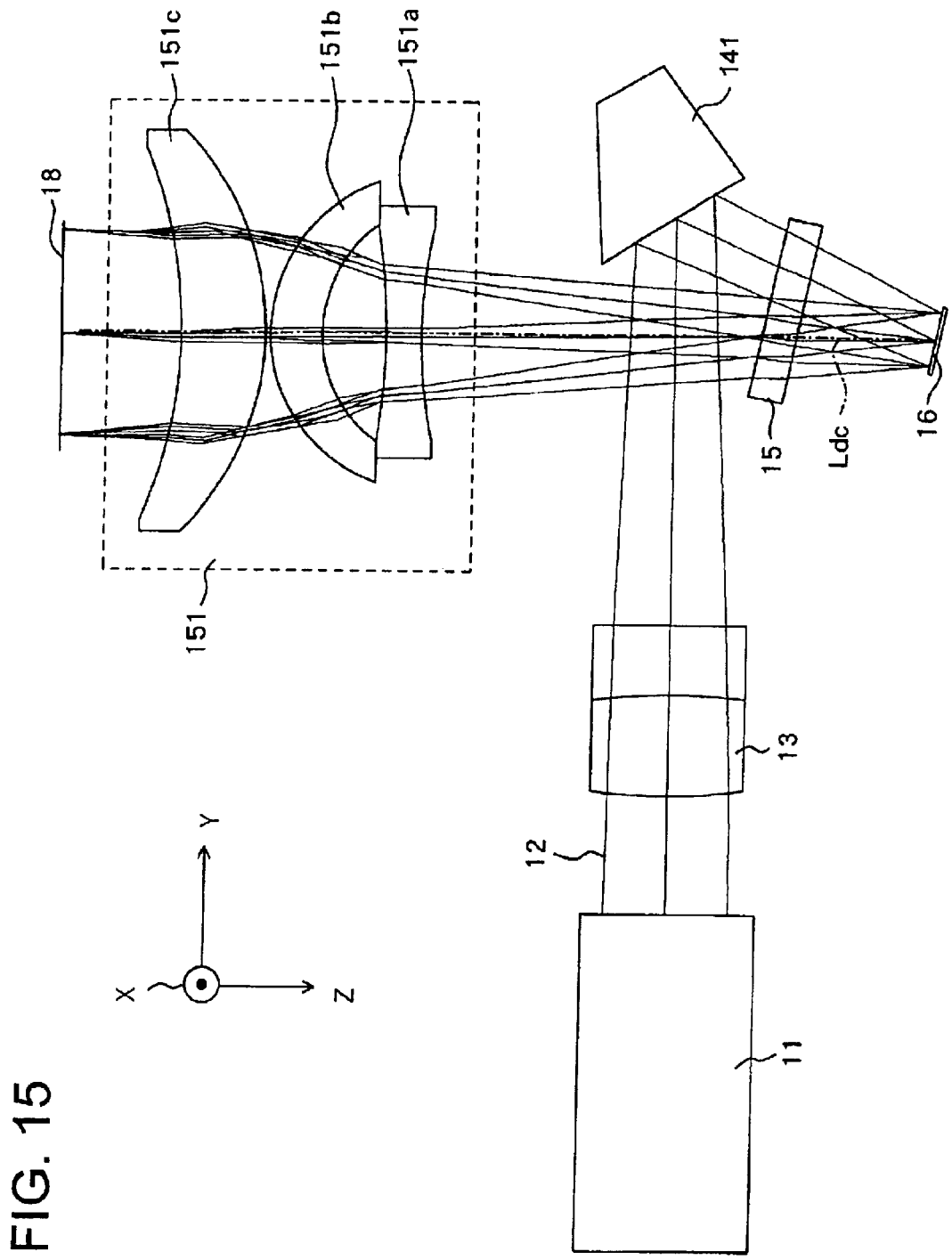
FIG. 15 shows a vertical sectional view of an optical system in a comparative example of Embodiment 4.

The following is a discussion of the optical system shown in FIG. 15 as a comparative example of the present embodiment. The scanning optical system 151 of this comparative example is configured by three lenses 151a, 151b and 151c respectively having negative, positive and positive power, and arranged in that order from the side of the deflection device 16. The three lenses 151a to 151c are not decentered (shifted) with respect to one another, and light beam that has passed through the scanning optical system 151 and travels toward the image center of the image plane 18, passes through the center of the lenses 151a to 151c. Also in FIG. 15, the light beam 12 incident on the deflection device 16 is inclined at 12.5 deg with respect to the normal on the deflection axis of the deflection device 16 in middle position that extends in the direction within the paper plane (Y direction) in FIG. 15. Therefore, a large TV distortion occurs in the image on the image plane 18.

Figure 16:
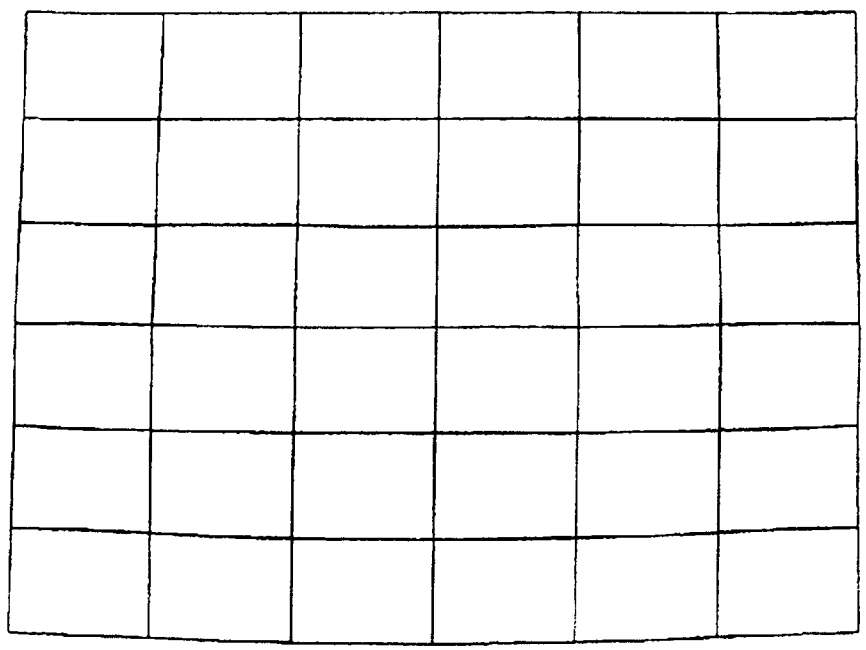
FIG. 16 shows a display image (lattice) according to the optical system of the comparative example.

FIG. 16 shows a display image (lattice) indicating the shape of the TV distortion in the optical system shown in FIG. 15, and Table 5 shows the amount of this TV distortion.

Figure 17:
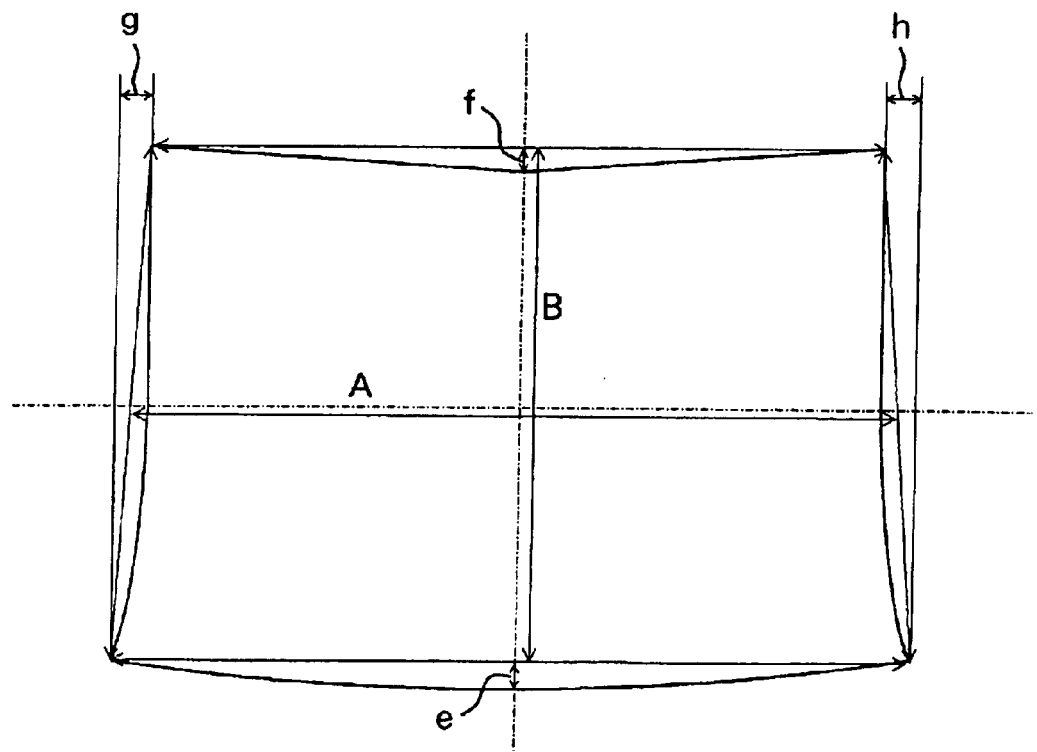
FIG. 17 is a diagram illustrating the method for calculating TV distortion.

As shown in FIG. 16, the horizontal lines that are supposed to be straight lines are curved considerably. The amount of this curving is 0.43% at the upper side and 1.79% at the lower side. Moreover, the image that is supposed to be rectangular is shaped like a trapezoid. The amount of this trapezoid distortion is 1.32% at the left and right sides (see Table 5). The amounts of the TV distortion and the trapezoidal distortion are as shown in FIG. 17, and their numerical values can be expressed by the following Expression 2.

TABLE 5

| TV distortion | | trapezoidal |
|---|---|---|
| upper side | lower side | distortion |
| 0.43% | 1.79% | 1.32% |

(Expression 2)
TV Distortion
 upper side: f/B×100 (%)
 lower side: e/B×100 (%)
Trapezoidal Distortion
 left side: g/A×100 (%)
 right side: h/A×100 (%)

Thus, with the scanning optical system 151 of a structure that does not use decentered lenses as shown in FIG. 15, the TV distortion that occurs when light beam is obliquely incident on the deflection device 16 cannot be suppressed, and a two-dimensional image of high quality cannot be attained.

By contrast, with the present embodiment, the third lens (positive lens) 142b of the scanning optical system 142 is tilted by 10.63 deg clockwise (to the minus side) in FIG. 14. This means a tilt to the side on which the light beam 12 is incident on the deflection device 16 (to the right in FIG. 14)

with respect to the optical axis Ldc. In other words, it means a tilt in such a direction that the light beam incident on the deflection device 16 and the center axis of the third lens 142b become nearly parallel (such that the angle between the incident light beam and the center axis of the third lens 142b becomes small). Furthermore, this means a tilt in such a direction that the center of the image-plane side surface of the third lens 142b moves to the side on which the light beam 12 is incident on the deflection device 16 with respect to the optical axis Ldc. This is also the same in Embodiments described below.

Moreover, the third lens 142b is shifted in the section of incidence on the deflection device 16 by 0.25 mm to the right side (to the minus side) in FIG. 14 with respect to the optical axis Ldc of the scanning optical system 142. This means a shift with respect to the optical axis Ldc of the scanning optical system 142 to the side on which the light beam 12 is incident on the deflection device 16. In other words, it means a shift closer to the light beam incident on the deflection device 16.

This is equivalent to rotating the third lens 142b at a rotation radius of 1.32 mm clockwise for 10.63 deg, taking as the rotation center a point located at a 0.22 mm shift on the optical axis Ldc of the scanning optical system 142 from the second surface (emergent surface: surface No.12 in Table 4) of the first lens (negative lens) 142a toward the image plane 18.

Moreover, the second lens (positive meniscus lens) 141c is shifted by 0.99 mm within the section of incidence on the deflection device 16 with respect to the optical axis Ldc of the scanning optical system 142 to the opposite of the side on which the light beam 12 is incident on the deflection device 16, that is, to the left (the plus side) in FIG. 14. Thus, the second lens 141c is shifted to the side away from the light beam 12 incident on the deflection device 16.

Figure 18:
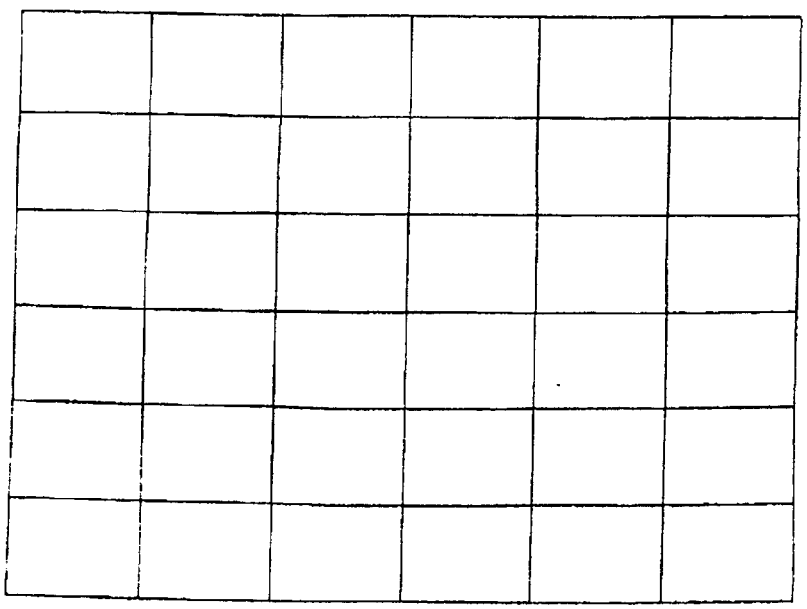
FIG. 18 shows a display image (lattice) according to Embodiment 4.

FIG. 18 shows an image (lattice) formed by the scanning display optical system of the present embodiment in FIG. 15, and Table 6 shows the amounts of the TV distortion and the trapezoidal distortion of this image.

TABLE 6

| TV distortion | | trapezoidal |
|---|---|---|
| upper side | lower side | distortion |
| 0.41% | 0.79% | 0.56% |

Comparing FIG. 16 and FIG. 18, it can be seen that the curvature of the upper and lower sides of the image formed on the image plane 18 in the present embodiment is small, and also the trapezoidal distortion is extremely small. Moreover, from Table 6, it can be seen that the TV distortion is reduced considerably below that in the optical system shown in FIG. 15, with a TV distortion of 0.41% at the upper side, 0.79% at the lower side, and a trapezoidal distortion of 0.56% on the left and right. Thus, by applying an appropriate tilt and shift to the optical elements constituting the scanning optical system, it is possible to favorably correct the TV distortion and the trapezoidal distortion.

In particular, in the present embodiment, tilting the third lens (positive lens) 142b corrects the trapezoidal distortion, and shifting the second lens (positive meniscus lens) 142c corrects the TV distortion. It should be noted that the two influence one another, and it is necessary to devise a design in which both are balanced. Moreover, by letting the convex surface of the second lens (positive meniscus lens) 142c face the image plane 18, the aberrations caused by tilting the third lens (positive lens) 142b are reduced. Furthermore, making the second lens 142c a meniscus lens reduces the influence of the tilting of the third lens 142b on the curvature of field.

Figure 19:
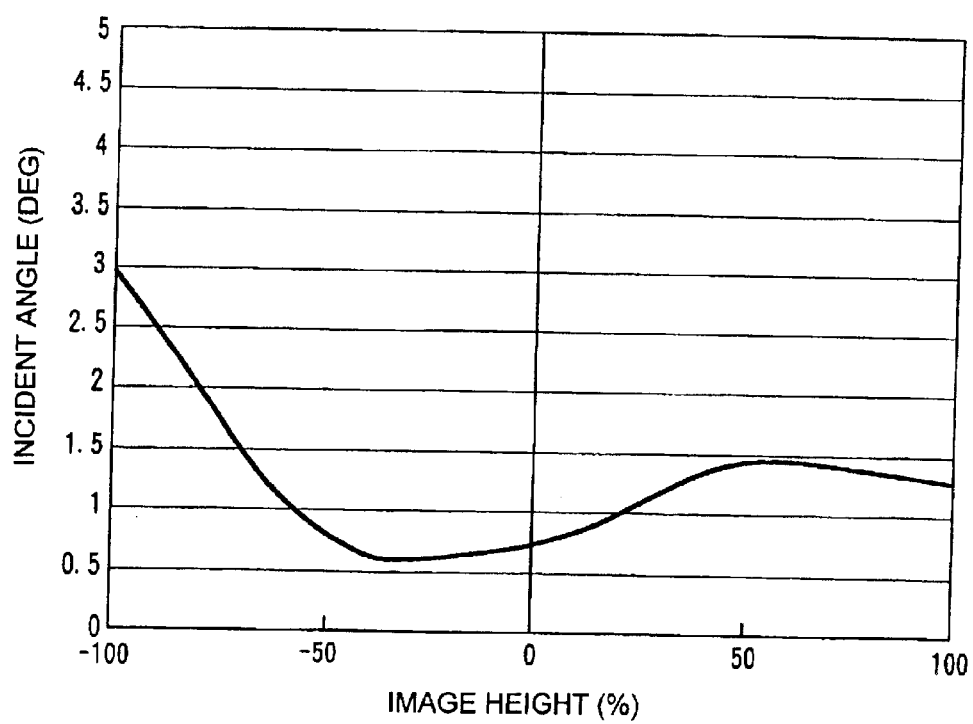
FIG. 19 illustrates the characteristics of the incident angle on the image plane of the scanning type optical system according to Embodiment 4.

FIG. 19 shows the relation between the image height and the angle (incident angle) at which the light beam is incident from the scanning optical system 142 on the image plane 18. The horizontal axis denotes the image height (%) and the vertical axis denotes the incident angle (deg).

From FIG. 19, it can be seen that for all image heights, there is good telecentricity with incident angles of 5 deg or less. Because the scanning optical system 142 is such telecentric, changes in the moving characteristics of the scanning spot and changes in the image plane size on the image plane 18 due to defocusing can be made small.

In the present embodiment, a converging lens 13 is provided as an optical system directing the light beam from the light source 11 to the deflection device 16, separate from the scanning optical system 142. The light beam 12 incident on the deflection device 16 is converged by the converging lens 13, so that the optical power is split between the converging lens 13 and the scanning optical system 142. Thus, the actions of the converging lens 13 and the scanning optical system 142 can be split into letting the converging lens 13 forms an image with the light beam 12 and letting the scanning optical system 142 correct distortion and astigmatic difference.

In the present embodiment, the reflective surface (mirror) 141 is provided in the optical path between the converging lens 13 and the deflection device 16. By inserting this reflective surface 141, the optical system directing the light beam 12 from the light source 11 to the deflection device 16 can be made compact, and the degree of freedom for arranging the light source 11 can be increased.

In the present embodiment, the Abbe number ν1 of the glass material of the negative lens (142a) is 35.3, the Abbe number ν2 of the glass material of the positive meniscus lens (142c) is 52.6, that is:

ν1<ν2

Figure 20:
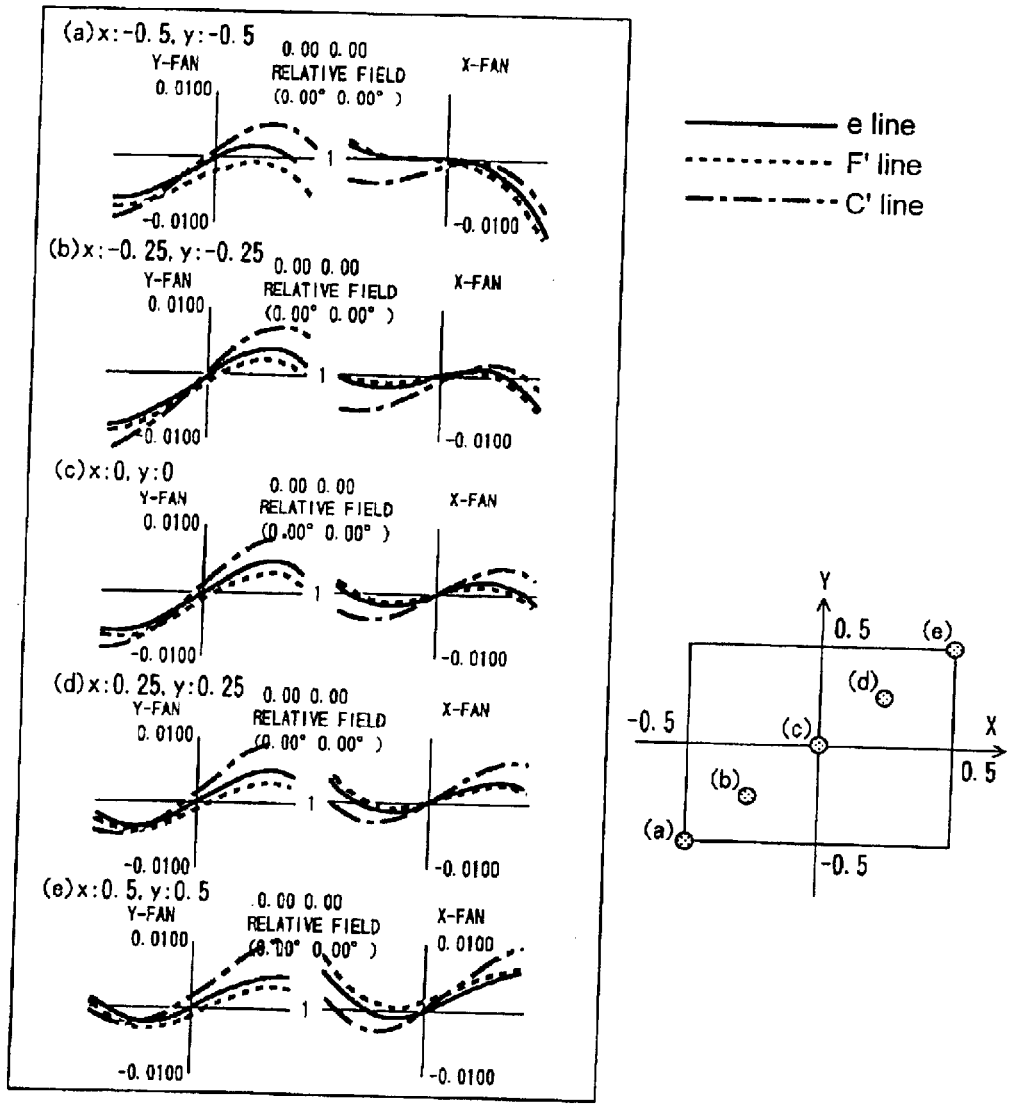
FIG. 20 shows lateral aberration graphs of the scanning type optical system in Embodiment 4.

With this relation between the Abbe numbers, the scanning optical system 142 can be provided with the action of correcting chromatic aberration if light with a plurality of different wavelengths is emitted from the light source 11. FIG. 20 shows lateral aberration graphs for the case that F' line (wavelength: 479.99 nm), e line (wavelength: 546.07 nm), and C' line (wavelength: 643.85 nm) is given as the light from the light source 11 in this embodiment.

In FIG. 20, the image formation range due to the light deflection in x-direction (horizontal direction) and y-direction (perpendicular direction) with the deflection device 16 is respectively taken as 1, and lateral aberration graphs are shown for the following positions:

(a) x: −0.5, y: −0.5
(b) x: −0.25, y: −0.25
(c) x: 0, y: 0
(d) x: 0.25, y: 0.25
(e) x: 0.5, y: 0.5

In FIG. 20, the solid line denotes the e line, the dash-dotted line denotes the C' line and the broken line denotes the F' line. From FIG. 20, it can be seen that the scanning optical system 142 performs a favorable correction of chromatic aberration when light with a plurality of different wavelengths is emitted from the light source 11. It should be noted that if the light from the light source 11 has a single wavelength, then the effect is attained that there is hardly any change in the performance of the scanning optical system 142 even when the wavelength of the light source 11 changes.

Embodiment 5

Figure 21:
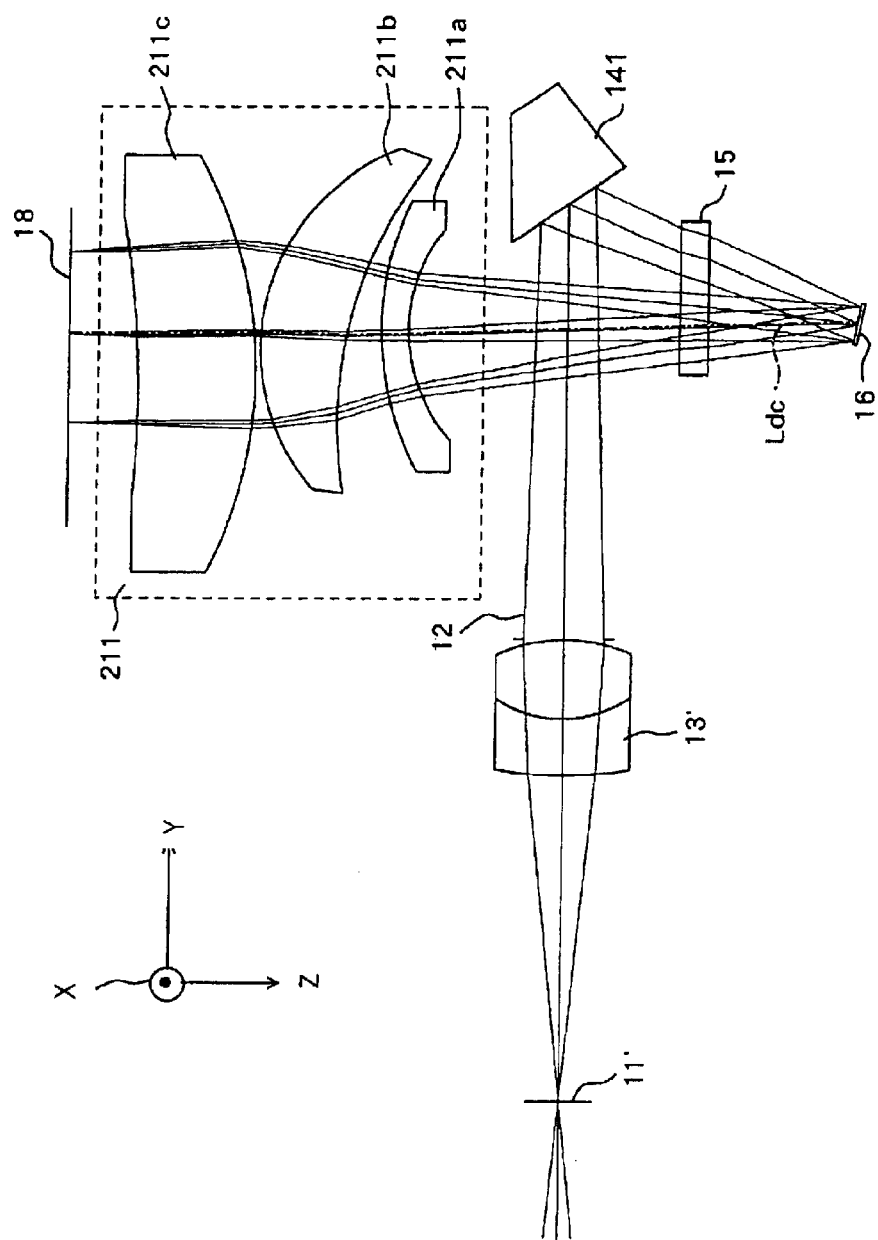
FIG. 21 shows a vertical sectional view of a scanning type display optical system according to Embodiment 5 of the present invention.

FIG. 21 shows a vertical section of a scanning type display optical system according to Embodiment 5 of the present invention. This embodiment corresponds to an arrangement in which the size of the image plane of Embodiment 4 is enlarged.

A scanning optical system 211 in this embodiment comprises a first lens (negative lens) 211a, a second lens (positive meniscus lens) 211c and a third lens (positive lens) 211b, which are arranged similarly to Embodiment 4.

In the present embodiment, the amplitude of the deflection mirror of the deflection device 16 is the same as in Embodiment 4, but the width of that amplitude that is used for the deflection of a light beam is set to 80% to 90%, and only 5% on either side remain blank. Thus, the size of the image plane becomes 1.11 times larger than in Embodiment 4. It should be noted that the oblique incident angle of the light beam 12 onto the deflection device 16 is 12.5 deg, which is the same as in Embodiment 4. Furthermore, the converging lens 13' is changed from an infinite conjugate lens converging parallel light rays, to a finite conjugate lens converting divergent light rays from a point light source 11' into converging light rays.

Table 7 shows curvature radius, spacing, tilt amount and shift amount of the respective optical elements in a numerical example according to the present embodiment. The tilt amount and the shift amount indicate the amounts of inclination and displacement with respect to the optical axis Ldc of the scanning optical system 211 in the section of incidence on the deflection device 16.

TABLE 7

| element name | ref. numeral | surface number | curv. radius | spacing | nd | vd |
|---|---|---|---|---|---|---|
| light source | 11' | | | 12.25 | | |
| converg. lens (pos.) | 13' | 1 | 17.35 | 2.00 | 1.699 | 30.1 |
| | | 2 | 4.41 | 0.00 | | |
| converg. lens (neg.) | | 3 | 4.41 | 3.01 | 1.517 | 52.4 |
| | | 4 | −5.80 | 16.50 | | |
| mirror | 141 | 5 | ∞ | 4.50 | | |
| protective glass | 15 | 6 | ∞ | 1.09 | 1.516 | 64.1 |
| | | 7 | ∞ | 6.09 | | |
| deflection mirror | 16 | 8 | ∞ | 5.59 | | |
| protective glass | 15 | 9 | ∞ | 1.00 | 1.516 | 64.1 |
| | | 10 | ∞ | 10.00 | | |
| neg. lens | 211a | 11 | −6.18 | 1.00 | 1.699 | 30.1 |
| | | 12 | −11.47 | 1.10 | | |
| second pos. lens | 211b | 13 | −15.95 | 3.20 | 1.487 | 70.2 |
| | | 14 | −7.94 inclin. −15.41 | 0.50 shift −0.72 | | |
| pos. meniscus lens | 211c | 15 | 16.75 | 4.30 | 1.834 | 37.2 |
| | | 16 | 45.47 shift 0.83 | 2.40 | | |
| image plane | | 18 | image plane | ∞ | | |

Also in this embodiment, as in Embodiment 4, the third lens (positive lens) 211b of the scanning optical system 211 is tilted with respect to the optical axis Ldc of the scanning optical system 211, and the second lens (positive meniscus lens) 211c is shifted with respect to the optical axis Ldc, thereby correcting the TV distortion and the trapezoidal distortion of images formed on the image plane 8.

In the present embodiment, the third lens 211b is tilted 15.41 deg clockwise (to the minus side) in FIG. 21 with respect to the optical axis Ldc of the scanning optical system 211 in the section of incidence on the deflection device 16 (YZ section). This means a tilt with respect to the optical axis Ldc of the scanning optical system 211 toward the side on which the light beam 12 is incident on the deflection device 16. In other words, it means a tilt in such a direction that the light beam incident on the deflection device 16 and the center axis of the lens 211b become nearly parallel (such that the angle between the incident light beam and the center axis of the lens 211b becomes small).

Moreover, the third lens 211b is shifted in the section of incidence on the deflection device 16 by 0.72 mm to the right (to the minus side) in FIG. 14 with respect to the optical axis Ldc of the scanning optical system 211. This means a shift to the side on which the light beam 12 is incident on the deflection device 16. In other words, it means a shift closer toward the light beam 12 incident on the deflection device 16.

This is equivalent to rotating the third lens 211b at a rotation radius of 2.60 mm clockwise for 15.41 deg, taking as the rotation center a point located at a 0.50 mm shift on the optical axis Ldc of the scanning optical system 211 from the first surface (incident surface: surface No.11 in Table 7) of the first lens (negative lens) 211a toward the deflection device 16.

Moreover, the second lens 211c is shifted by 0.83 mm within the section of incidence on the deflection device 16 with respect to the optical axis Ldc of the scanning optical system 211 to the left (the plus side) in FIG. 21. This is a shift with respect to the optical axis Ldc of the scanning optical system 211 to the opposite of the side from which the light beam 12 is incident on the deflection device 16, that is, to the side away from the light beam 12 incident on the deflection device 16.

Figure 22:
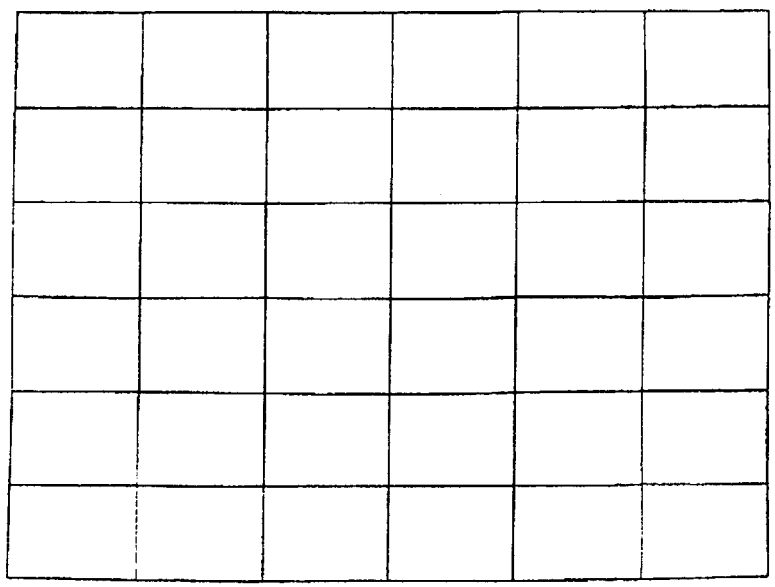
FIG. 22 shows a display image (lattice) according to Embodiment 5.

FIG. 22 shows a scanning image (lattice) with the scanning display optical system of the present embodiment, and Table 8 lists the amounts of the TV distortion and the trapezoidal distortion of this scanning image.

TABLE 8

| TV distortion | | trapezoidal |
|---|---|---|
| upper side | lower side | distortion |
| 0.39% | 0.70% | 0.57% |

When the amplitude used for the deflection of the light beam with the deflection device 16 becomes large, the amounts of TV distortion and trapezoidal distortion also become large. However, from Table 8, it can be seen that in this embodiment the amounts of TV distortion and trapezoidal distortion are small, with a TV distortion of 0.39% at the upper side, 0.70% at the lower side, and a trapezoidal distortion of 0.57% on the left and right, and the TV distortion and trapezoidal distortion are corrected favorably.

Thus, even when the deflection range (deflection angle) of the light beam with the deflection device 16 becomes large, the TV distortion and trapezoidal distortion can be corrected favorably by tilting and shifting the third lens 211b and shifting the second lens 211c.

Figure 23:
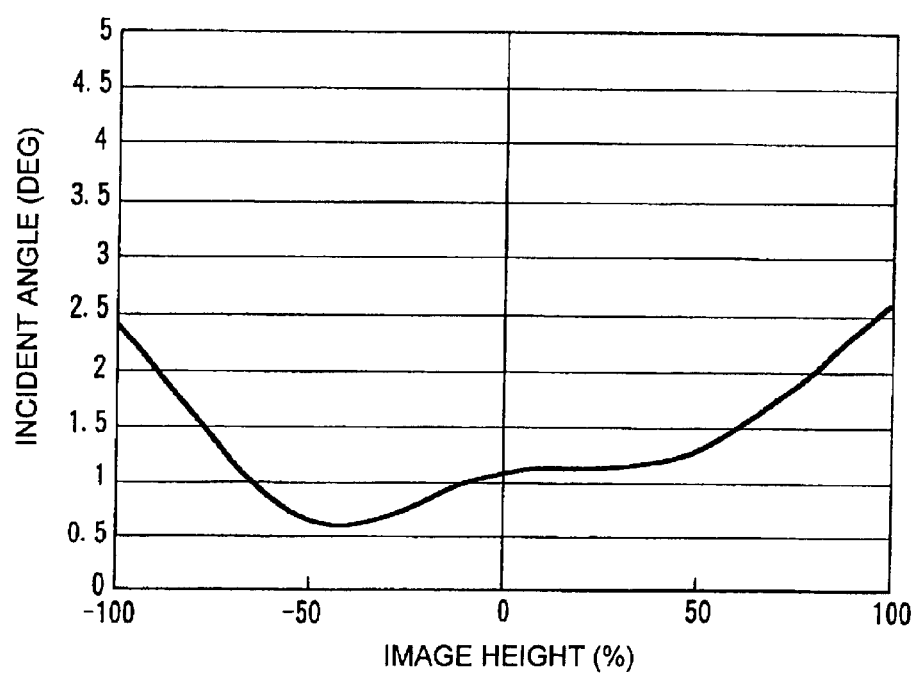
FIG. 23 illustrates the characteristics of the incident angle on the image plane of the scanning type optical system according to Embodiment 5.

FIG. 23 shows the relation between the angle (incident angle) at which the light beam is incident from the scanning optical system 211 on the image plane 18 and the position (image height) in the image on the image plane 18. The horizontal axis denotes the image height (%) and the vertical axis denotes the incident angle (deg) on the image plane 18. From FIG. 23, it can be seen that also the scanning device 211 of the present embodiment has good telecentricity with incident angles on the image plane of 5 deg or less. Because the scanning optical system 211 is such telecentric, changes in the moving characteristics of the scanning spot and changes in the image plane size on the image plane 18 due to defocusing are small.

Embodiment 6

Figure 24:
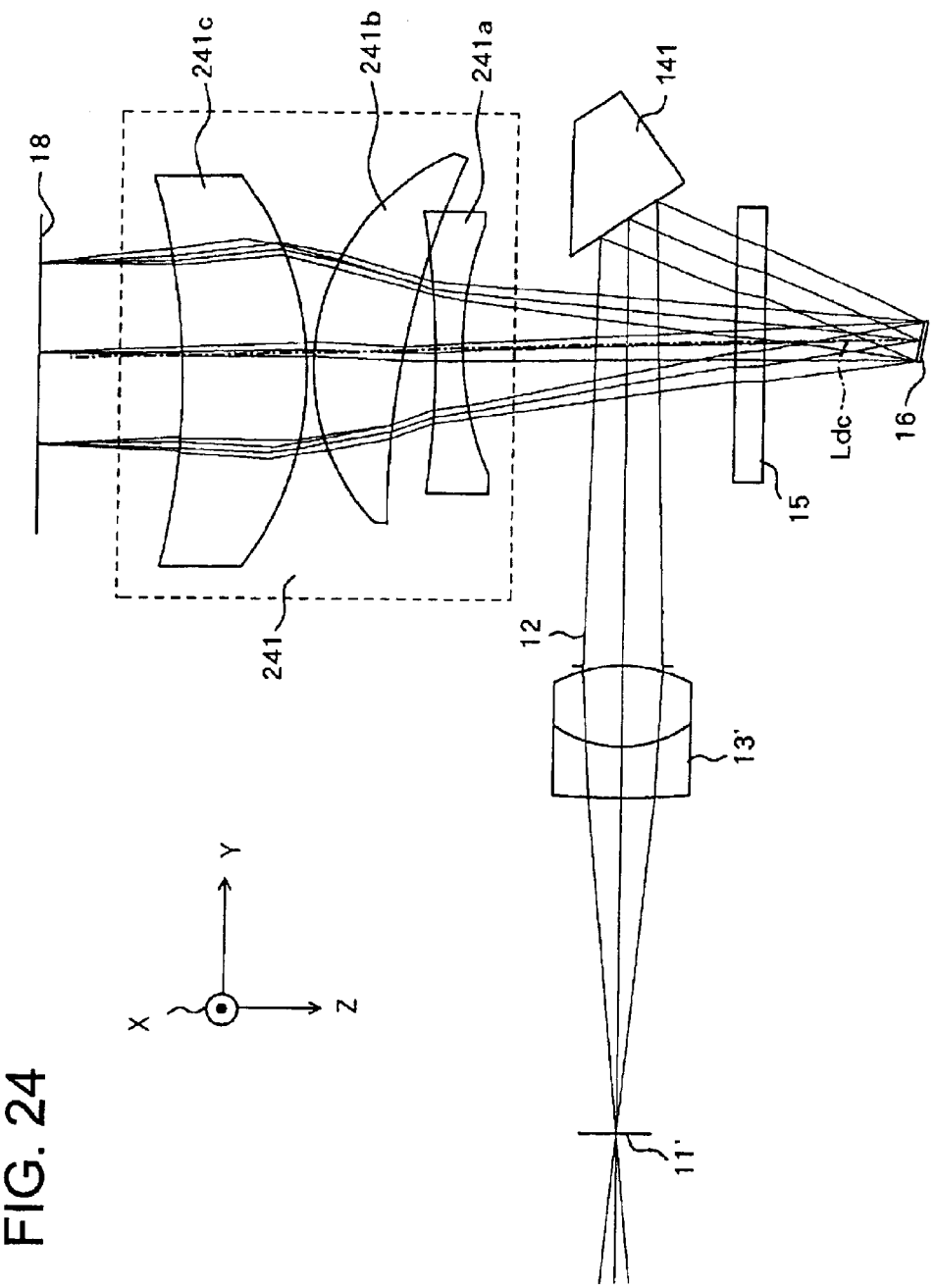
FIG. 24 shows a vertical sectional view of a scanning type display optical system according to Embodiment 6 of the present invention.

FIG. 24 shows a vertical section of a scanning type display optical system according to Embodiment 6 of the present invention. This embodiment corresponds to an arrangement in which rotation symmetric aspheric surfaces are introduced in the scanning optical system of Embodiment 5.

A scanning optical system 241 in this embodiment comprises a first lens (negative lens) 241a, a second lens (positive meniscus lens) 241c and a third lens (positive lens) 241b, which are arranged similarly to Embodiment 5.

Other aspects, such as the amplitudes of the deflection device 16, its width used for deflection of the light beam, or the angle at which the light beam 12 is incident obliquely on the deflection device 16, are the same as in Embodiment 5.

Table 9 shows curvature radius, spacing, tilt amount and shift amount of the respective optical elements in a numerical example according to the present embodiment. The tilt amount and the shift amount indicate the amounts of inclination and displacement with respect to the optical axis Ldc of the scanning optical system in the section of incidence on the deflection device 16. Moreover, the asphoric surface coefficients (K, A, B, C and D) are also given for the surface of the third lens (positive lens) 241b on the side of the image plane (emergent surface: surface No. 14 in Table 9), and the surface of the second lens (positive meniscus lens) on the side of the deflection device (incident surface: surface No. 15 in Table 9), which are the rotation symmetric aspheric surfaces. It should be noted that the rotation symmetric aspheric surfaces can be expressed by Expression 1, which was explained for Embodiment 3.

TABLE 9

| element name | ref. numeral | surface number | curv. radius | spacing | nd | vd |
|---|---|---|---|---|---|---|
| light source | 11' | | | 12.13 | | |
| converg. lens (pos.) | 13' | 1 | 17.40 | 1.93 | 1.699 | 30.1 |
| | | 2 | 4.44 | 0.00 | | |
| converg. lens (neg.) | | 3 | 4.44 | 2.95 | 1.517 | 52.4 |
| | | 4 | −5.83 | 16.50 | | |
| mirror | 141 | 5 | ∞ | 4.42 | | |
| protective glass | 15 | 6 | ∞ | 1.09 | 1.516 | 64.1 |
| | | 7 | ∞ | 6.09 | | |
| deflection mirror | 16 | 8 | ∞ | 5.59 | | |
| protective glass | 15 | 9 | ∞ | 1.00 | 1.516 | 84.1 |
| | | 10 | ∞ | 10.00 | | |
| neg. lens | 241a | 11 | −12.32 | 1.00 | 1.699 | 30.1 |
| | | 12 | 32.01 | 1.05 | | |
| second pos. lens | 241b | 13 | −31.61 | 3.26 | 1.487 | 70.2 |
| | | 14 | −8.85 inclin. −13.09 | 0.50 shift −0.59 | | |
| | | K 0.000E+00 | A −2.782E−05 | B 5.448E−06 | | |
| | | | C −3.213E−08 | D 0.000E+00 | | |
| pos. menis- | 241c | 15 | 11.96 K | 4.50 A | 1.834 | 37.2 |

TABLE 9-continued

| element name | ref. numeral | surface number | curv. radius | spacing | nd | vd |
|---|---|---|---|---|---|---|
| cus lens | | 0.000E+00 | −1.159E−05 C 8.765E−09 shift 0.72 | −5.350E−07 D 0.000E+00 | | |
| image plane | 18 | 16 image plane | 30.00 ∞ | 5.25 | | |

In the present embodiment (numerical example), the third lens 241b is tilted 13.09 deg clockwise (to the minus side) in FIG. 24 with respect to the optical axis Ldc of the scanning optical system 241 in the section of incidence on the deflection device 16 (YZ section). This means a tilt with respect to the optical axis Ldc of the scanning optical system 241 toward the side from which the light beam 12 is incident on the deflection device 16. In other words, it means a tilt in such a direction that the light beam incident on the deflection device 16 and the center axis of the third lens 241b are nearly parallel (such that the angle between the incident light beam and the center axis of the third lens 241b becomes small).

Moreover, the third lens 241b is shifted in the section of incidence on the deflection device 16 by 0.59 mm to the right (to the minus side) in FIG. 24 with respect to the optical axis of the scanning optical system 241. This means a shift with respect to the optical axis Ldc of the scanning optical system 241 to the side on which the light beam 12 is incident on the deflection device 16. In other words, it means a shift closer toward the light beam 12 incident on the deflection device 16.

This is equivalent to rotating the third lens 241b at a rotation radius of 2.54 mm clockwise for 13.09 deg, taking as the rotation center a point located at a 0.49 mm shift on the optical axis Ldc of the scanning optical system 241 from the first surface (incident surface: surface No. 11 in Table 9) of the first lens (negative lens) 241a toward the deflection device 16.

Moreover, the second lens 241c is shifted by 0.72 mm within the section of incidence on the deflection device 16 with respect to the optical axis Ldc of the scanning optical system 241 to the left (the plus side) in FIG. 24. This is a shift with respect to the optical axis Ldc of the scanning optical system 241 to the opposite of the side from which the light beam 12 is incident on the deflection device 16, that is, to the side away from the light beam 12 incident on the deflection device 16.

Figure 25:
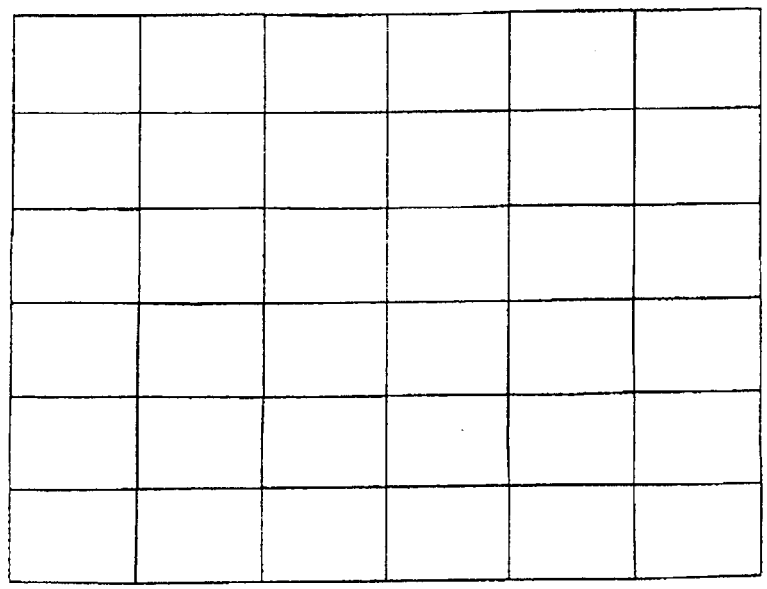
FIG. 25 shows a display image (lattice) according to Embodiment 6.

FIG. 25 shows a scanning image (lattice) according to the scanning display optical system of the present embodiment, and Table 10 lists the amount of the TV distortion and the trapezoidal distortion of this scanning image.

TABLE 10

| TV distortion | | trapezoidal |
|---|---|---|
| upper side | lower side | distortion |
| 0.45% | 0.55% | 0.55% |

From Table 10, it is can be seen that in this embodiment the amounts of TV distortion and trapezoidal distortion are small, with a TV distortion of 0.45% at the upper side, 0.55% at the lower side, and a trapezoidal distortion of 0.55% on the left and right, and the TV distortion and trapezoidal distortion are corrected favorably.

In this embodiment, by introducing rotation symmetric aspheric surfaces in the scanning optical system 241, influence on aberrations can be reduced while maintaining the effect of tilting and shifting the third lens 241b, which is a positive lens, and the effect of correcting TV distortion and trapezoidal distortion by shifting the second lens 241c, which is a positive meniscus lens. Thus, it is possible to distribute the tasks of correcting TV distortion and correcting trapezoidal distortion.

Figure 26:
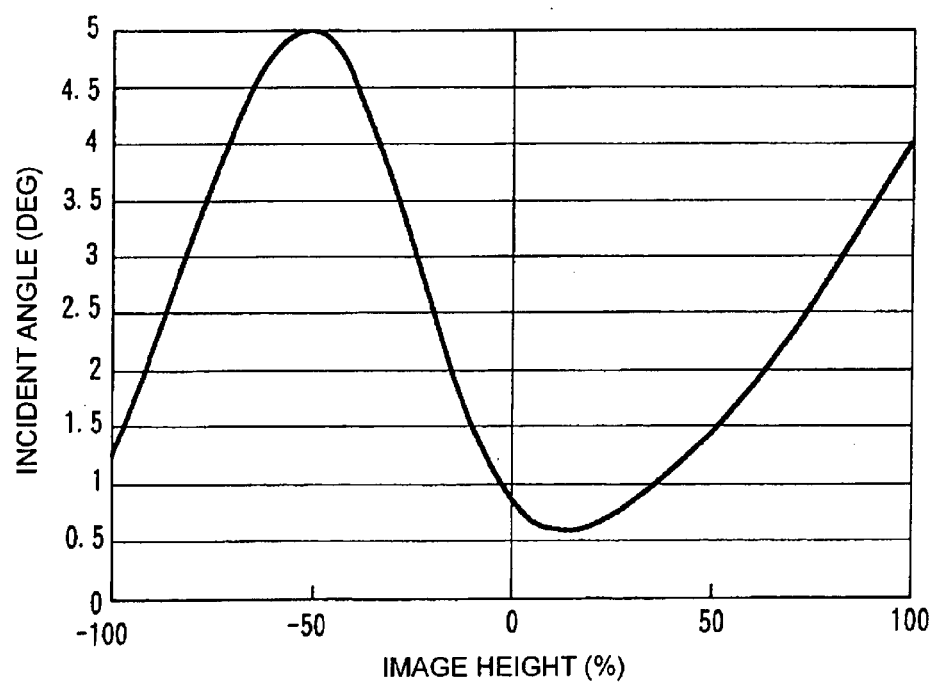
FIG. 26 illustrates the characteristics of the incident angle on the image plane of the scanning type optical system according to Embodiment 6.

FIG. 26 shows the relation between the angle(incident angle) at which the light beam is incident from the scanning optical system 241 on the image plane 18 and the position (image height) on the image plane 18. The horizontal axis denotes the relative position on the diagonal direction of the image (%) and the vertical axis denotes the incident angle on the image plane.

From FIG. 26, it can be seen that also in the present embodiment, the scanning optical device 241 has good telecentricity with incident angles on the image plane 18 of 5 deg or less. Because the scanning optical system 241 is such telecentric, changes in the moving characteristics of the scanning spot and changes in the image plane size on the image plane 18 due to defocusing are small.

It should be noted that in all of the Embodiments 4 to 6, the light beam is incident on the deflection device from a sectional plane that includes the deflection axis in the primary scanning direction but it is also possible to let the light beam be incident from a section including the deflection axis in the secondary scanning direction.

Embodiment 7

Figure 27:
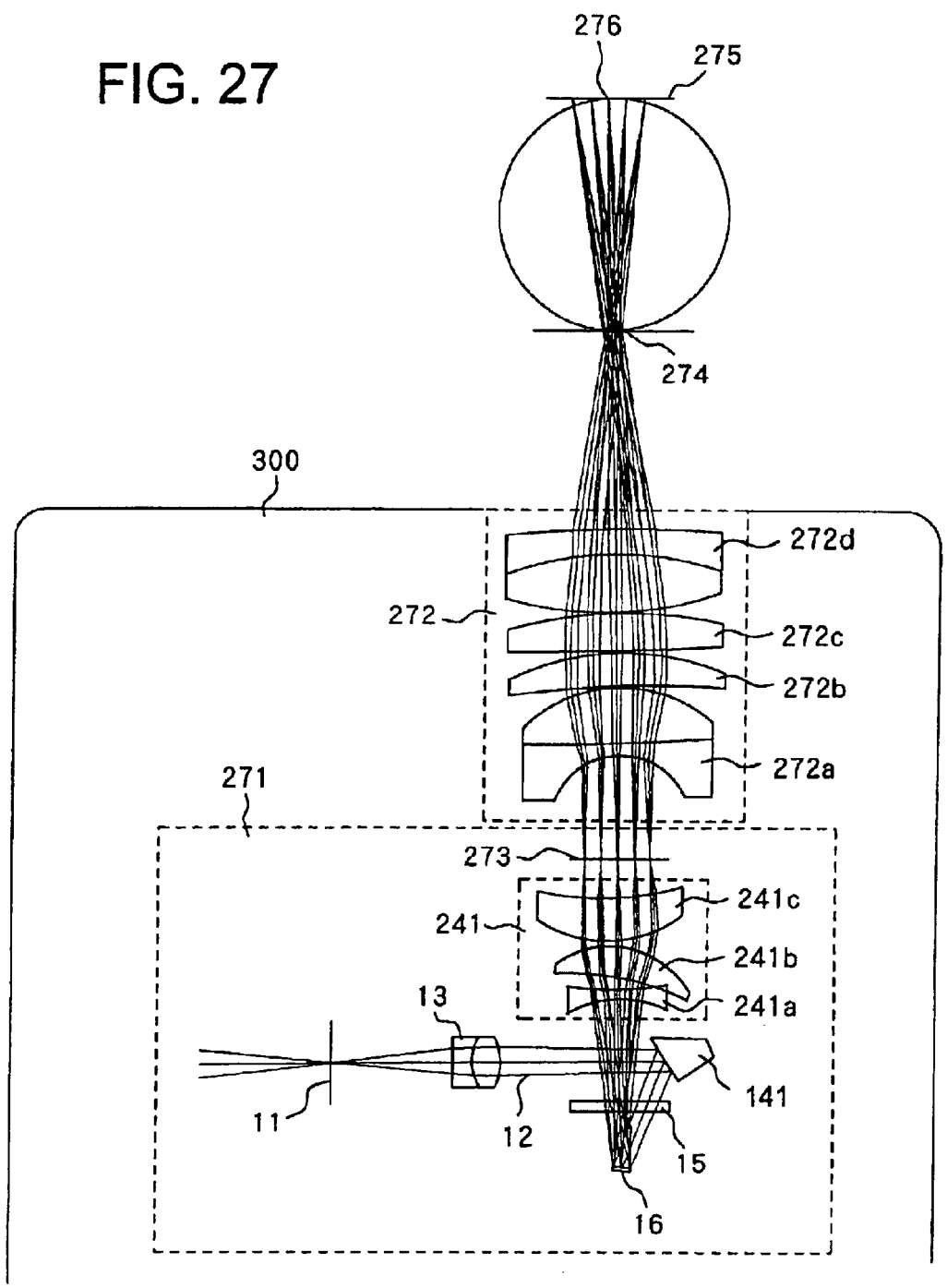
FIG. 27 shows a vertical sectional view of a scanning type display optical system according to Embodiment 7 of the present invention.

FIG. 27 shows a vertical section of a retinal scanning type display optical system according to Embodiment 7 of the present invention. This retinal scanning type display optical system is mounted into an optical apparatus 300 such as an image-pickup apparatus (video camera, digital still camera, etc.) or an observing apparatus, and constitutes an electronic viewfinder.

In the retinal scanning type display optical system of the present embodiment, an eyepiece optical system 272 serving as a second optical system is arranged behind the image plane 18 of the scanning type display optical system shown in Embodiment 6. This retinal scanning type display optical system deflects and scans a light beam in two dimensions with a deflection device 16, thus forming (rendering) an image directly on the retina 275 of an observer.

The scanning optical system 271 is the same as in Embodiment 6, so that here only the eyepiece optical system 272 behind the primary image forming plane 273 (corresponding to the image plane 18 in Embodiment 6) formed by the scanning type display optical system 271 and the optical function of this eyepiece optical system 272 are described.

The light beam 12 that is caused by the scanning type display optical system 271 to form an image on the primary image forming plane 273, becomes divergent light beam and enters the eyepiece optical system 272. The curvature radius and the spacings between the respective optical elements constituting the eyepiece optical system 272 are listed in Table 11. The eyepiece optical system 272 comprises first to sixth spherical lenses 272a to 272d (of which the first and second spherical lens as well as the fifth and sixth spherical lens are cemented together), whose optical axes match.

TABLE 11

| element name | ref. numeral | surface number | curv. radius | spacing | nd | vd |
|---|---|---|---|---|---|---|
| first lens | 272a | 1 | −7.05 | 1.00 | 1.603 | 38.0 |
| | | 2 | 114.46 | 0.00 | | |
| second lens | | 3 | 114.46 | 6.00 | 1.639 | 55.4 |
| | | 4 | −13.70 | 0.10 | | |
| third lens | 272b | 5 | −115.87 | 3.39 | 1.603 | 60.6 |
| | | 6 | −24.79 | 0.10 | | |
| fourth lens | 272c | 7 | 197.74 | 3.87 | 1.640 | 60.1 |
| | | 8 | −46.63 | 0.22 | | |
| fifth lens | 272d | 9 | 34.85 | 6.00 | 1.620 | 60.3 |
| | | 10 | −27.11 | 0.00 | | |
| sixth lens | | 11 | −27.11 | 2.00 | 1.762 | 26.5 |
| | | 12 | −762.98 | 21.00 | | |
| pupil | 274 | 13 | ∞ | | | |

In the present embodiment, the light beam 12 is converted by the eyepiece optical system 272 into substantially parallel light beam, and is incident on the eye (pupil) 274 of an observer. The light beam 12 that has entered the observer's pupil 274 forms an image on the retina 275 due to the action of the eye's lens, producing a spot image 276. Therefore, the spot image 276 is scanned in two dimensions on the observer's retina 275 by deflecting the light beam 12 in two dimensions with the deflection device 16.

Thus, a two-dimensional image is perceived by the observer due to the after-image effect of the spot image 276 scanned on the observer's retina 275.

Figure 28:
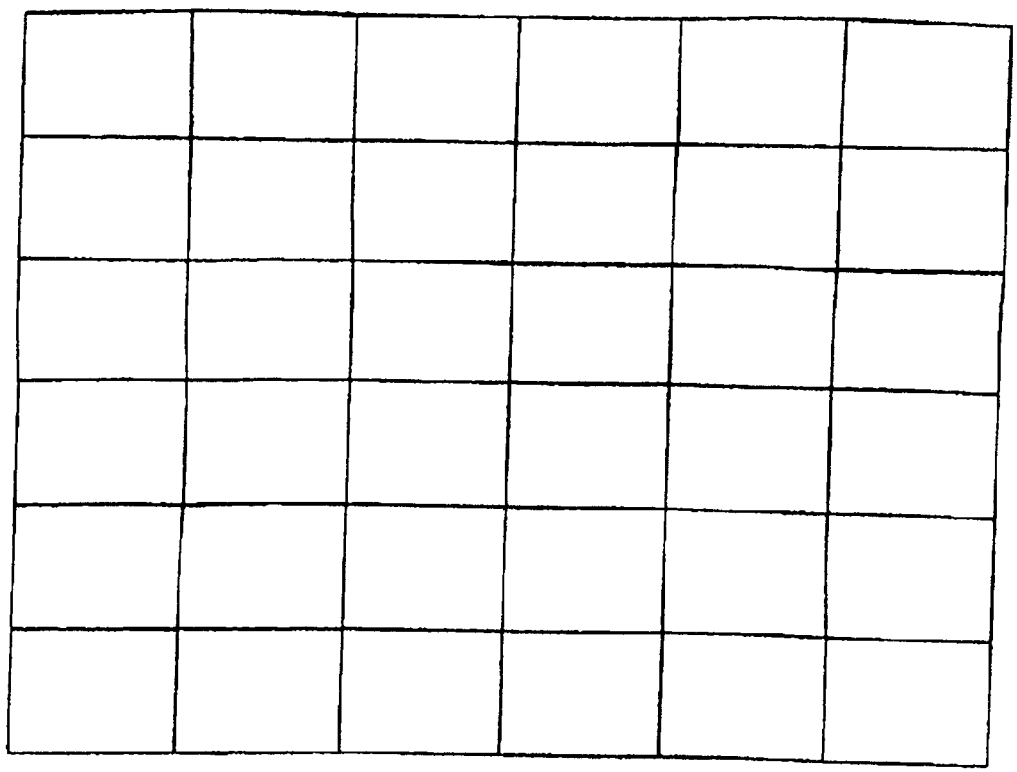
FIG. 28 shows a display image (lattice) according to Embodiment 7.

FIG. 28 shows an image (lattice) formed on the retina 275 in the present embodiment, and Table 12 lists the amounts of the TV distortion and trapezoidal distortion thereof.

TABLE 12

| TV distortion | | trapezoidal distortion |
|---|---|---|
| upper side | lower side | upper side |
| 0.33% | 0.58% | 0.58% |

From Table 12, it is can be seen that in this embodiment the amounts of TV distortion and trapezoidal distortion are small, with a TV distortion of 0.33% at the upper side, 0.58% at the lower side, and a trapezoidal distortion of 0.58% on the left and right, and the TV distortion and trapezoidal distortion are corrected favorably.

This embodiment is equivalent to enlarging by the eyepiece optical system 272 the aerial image formed on the primary image forming plane 273 by the scanning type display optical system 271. Since the TV distortion and the trapezoidal distortion of the aerial image on the primary image forming plane 273 are corrected, the TV distortion and the trapezoidal distortion of the image formed on the retina 275 are decreased as well.

Furthermore, in this embodiment the scanning type display optical system 271 is a substantially telecentric optical system. Therefore, it is easy to perform a dioptric adjustment by moving the eyepiece optical system 272 in a direction perpendicular to the primary image forming plane 273 (that is, in a direction parallel to the optical axis of the scanning optical system 241).

Moreover, in this embodiment, the wavelength of the light emitted form the light source is not specified in particular, but by using as the light source a plurality of light-emitting portions with red, green and blue wavelengths, it is possible to configure a full-color retinal scanning type display optical system.

It should be noted that Embodiments 4 to 7 have been explained for the case that all spherical and aspherical lenses used are rotation symmetric, but the same effects can be also be attained when aspherical lenses that are not rotation symmetric are used.

As explained above, with the Embodiments 4 to 7, if the light beam from the light source is obliquely incident on the deflection device, then it is possible to optically correct distortions such as TV distortion and trapezoidal distortion in the image formed by two-dimensional scanning of the light beam, by tilting or/and shifting the optical elements constituting the scanning optical system (first optical system) to the side on which the light beam coming from the light source is incident on the deflection device or to the opposite side. Consequently, it becomes possible to realize a scanning type display optical system allowing high-quality image observation.

More specifically, the scanning optical system includes a first optical element having negative optical power that is arranged furthest to the side of the deflection device, a second optical element having positive optical power that is arranged furthest to the side of the eyepiece optical system (second optical system), and a third optical element having positive power that is arranged between the first and the second optical elements. Moreover, the third optical element is tilted and shifted with respect to the center axis of a two-dimensional deflection range, over which the light beam is deflected by the deflection device, to the side on which the light beam coming from the light source is incident on the deflection device, and the second optical element is shifted to the opposite of the side on which the light beam coming from the light source is incident on the deflection device. Thus, distortions such as TV distortion and trapezoidal distortion can be corrected more effectively.

Moreover, the second optical element is formed as a meniscus lens whose convex surface faces toward the deflection device, and the third optical element is formed as a meniscus lens whose convex surface faces toward the eyepiece optical system. By forming the emergent surface of the third optical element as a convex surface, it is possible to reduce the influence on aberrations when tilting the third optical element.

Moreover, by making the incident angle of the light beam on the image plane of the scanning optical system 5° or less, the scanning optical system can be made a substantially telecentric optical system, and changes in the moving characteristics of the scanning spot and changes in the image plane size on the image plane can be made small even when the image plane is out of focus.

Moreover, by arranging a converging optical element, which converts light beam from the light source into converging light beam, between the light source and the scanning optical system, the optical power can be split between the converging optical element and the scanning optical system, and the scanning optical system can be configured as appropriate for correcting distortion and astigmatic difference.

Moreover, a reflective surface is arranged between the light source and the deflection device or between the converging optical element and the deflection device, and guides the light beam from the light source in such a manner that it is incident on the deflection device from a direction that is oblique with respect to the deflection axes. Thus, the optical system directing the light beam from the light source to the deflection device can be made compact, and the degree of freedom for arranging the light source can be increased.

Furthermore, by satisfying $v1 < v2$ it is possible to attain the effect that chromatic aberration is corrected, in particular when light with a plurality of different wavelengths is emitted from the light source.

Embodiment 8

Figure 29:
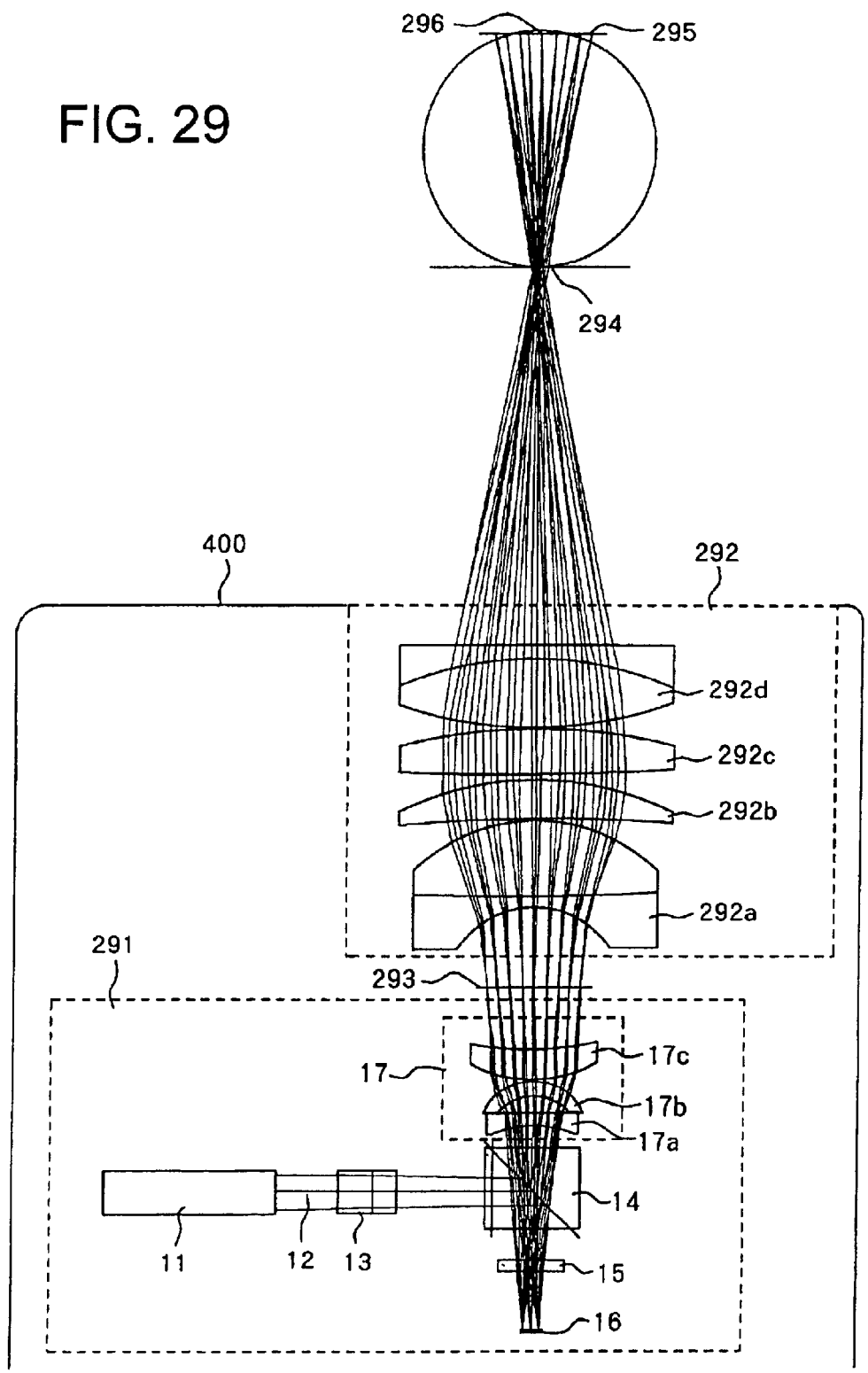
FIG. 29 shows a vertical sectional view of a scanning type display optical system according to Embodiment 8 of the present invention.

FIG. 29 shows a vertical section of a retinal scanning type display optical system according to Embodiment 8 of the present invention. This retinal scanning type display optical system is mounted into an optical apparatus 400 such as an image-pickup apparatus (video camera, digital still camera, etc.) or an observing apparatus, and constitutes an electronic viewfinder.

In the retinal scanning type display optical system of the present embodiment, an eyepiece optical system 292 serving as the second optical system is arranged behind the image plane 18 of a scanning type display optical system 291 as shown in Embodiment 1. This retinal scanning display optical system deflects and scans light beam in two dimensions with the deflection device 16, thus forming (rendering) an image on the retina 295 of an observer directly.

The scanning optical system 291 is the same as in Embodiment 1, so that here only the eyepiece optical system 292 behind the primary image forming plane 293 (corresponding to the image plane 18 in Embodiment 1) formed by the scanning display optical system 291 and the optical function of this eyepiece optical system 292 are described.

The light beam 12 that is caused by the scanning display optical system 291 to form an image on the primary image forming plane 293, becomes divergent light beam and enters the eyepiece optical system 292. The curvature radius and the spacings between the respective optical elements constituting the eyepiece optical system 292 are listed in Table 13. The eyepiece optical system 292 is constituted by first to sixth spherical lenses 292a to 292d (of which the first and second spherical lens as well as the fifth and the sixth spherical lens are cemented together), whose optical axes match.

TABLE 13

| element name | ref. numeral | surface number | curv. radius | spacing | nd | vd |
|---|---|---|---|---|---|---|
| first lens | 292a | 1 | −7.61 | 1.01 | 1.603 | 38.0 |
| | | 2 | 218.84 | 0.00 | | |
| second lens | | 3 | 218.84 | 6.50 | 1.639 | 55.4 |
| | | 4 | −14.75 | 0.10 | | |
| third lens | 292b | 5 | −125.14 | 3.29 | 1.603 | 60.6 |
| | | 6 | −26.46 | 0.39 | | |
| fourth lens | 292c | 7 | 157.98 | 4.00 | 1.652 | 58.6 |
| | | 8 | −48.54 | 0.10 | | |
| fifth lens | 292d | 9 | 33.86 | 6.00 | 1.620 | 60.3 |
| | | 10 | −29.35 | 1.01 | | |
| sixth lens | | 11 | −29.35 | 0.00 | 1.762 | 26.5 |
| | | 12 | 483.84 | 21.00 | | |
| pupil | 294 | 13 | ∞ | | | |

In the present embodiment, the light beam 12 is converted by the eyepiece optical system 292 into substantially parallel light beam, and is incident on the eye (pupil) 294 of an observer. The light beam 12 that has entered the observer's pupil 294 forms an image on the retina 295 due to the action of the eye's lens, producing a spot image 296. Therefore, the spot image 296 is scanned in two dimensions on the observer's retina 295 by deflecting the light beam 12 in two dimensions with the deflection device 16. Thus, a two-dimensional image is perceived by the observer due to the after-image effect of the spot image 296 scanned on the observer's retina 295.

Figure 30A:
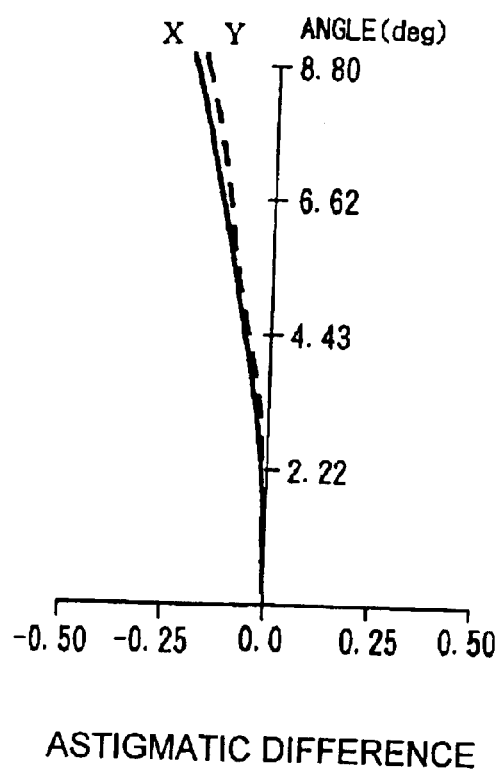
FIGS. 30A and 30B show aberration graphs of the optical system in Embodiment 8.
Figure 30B:
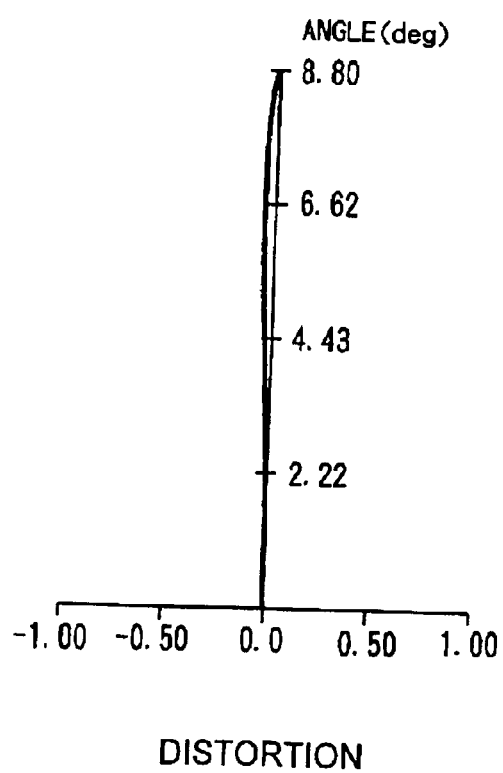

FIGS. 30A and 30B show aberration graphs of the optical system on the retina 295 with the present embodiment. In FIGS. 30A and 30B, to derive the aberration graphs, an ideal lens with a focal length of 22 mm was arranged at the position of the observer's pupil 294, and aberration of the image formed on the retina 295 was plotted. In FIGS. 30A and 30B, the horizontal axis denotes the pupil diameter, which in the present embodiment is set to De=1.5 mm (−0.75 mm<x <0.75 mm).

From FIG. 30, it can be seen that the retinal scanning type display optical system according to the present embodiment provides a high-quality image with little astigmatism and distortion.

Figure 31:
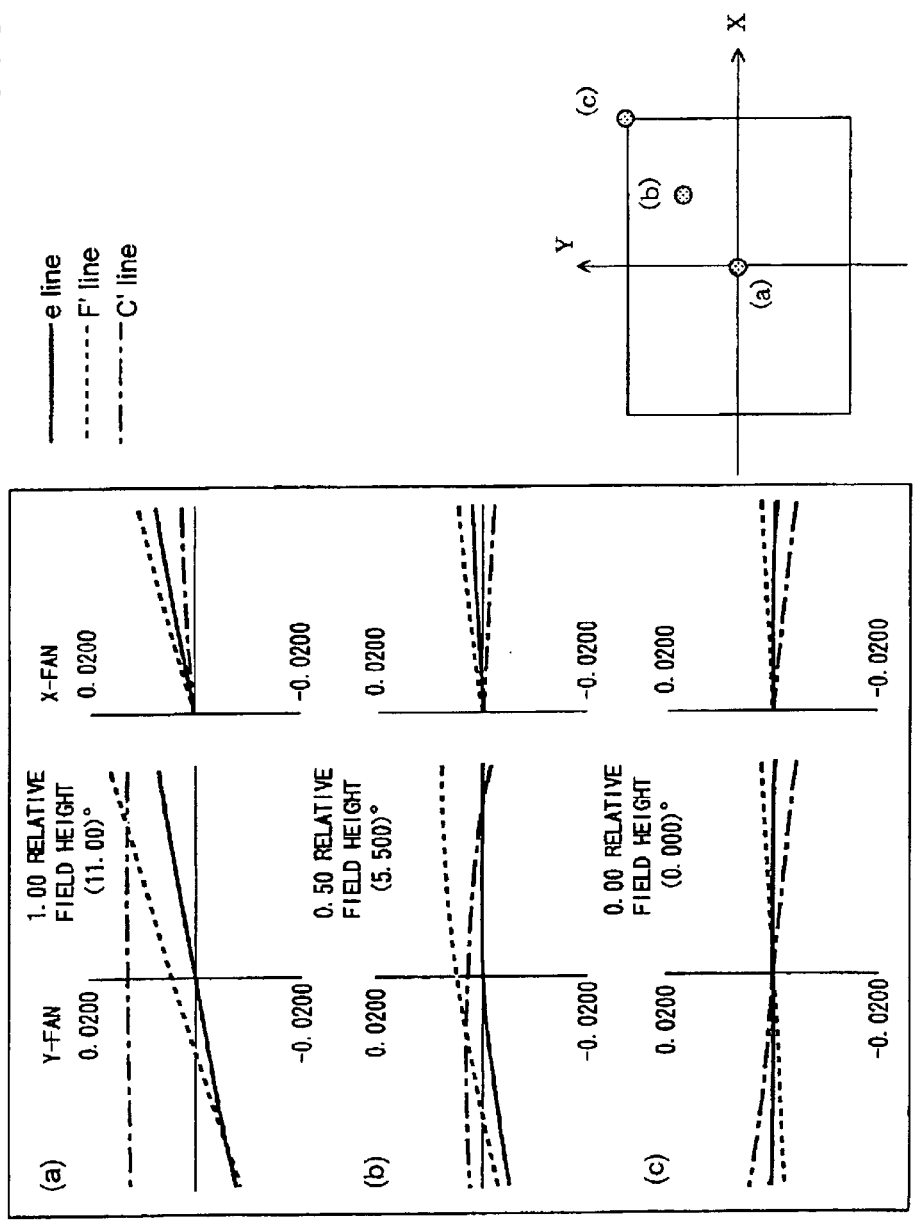
FIG. 31 shows lateral aberration graphs of the optical system in Embodiment 8.

Moreover, FIG. 31 shows lateral aberration graphs for the case that F' line, e line, and C' line is given as the light from the light source 11 in the optical system of this embodiment.

In FIG. 31, to derive the aberration graphs, an ideal lens with a focal length of 22 mm was arranged at the position of the observer's pupil 294, and aberration of the image formed on the retina was plotted. In FIG. 31, the solid line denotes the e line, the dash-dotted line denotes the C' line and the broken line denotes the F' line. Furthermore, the graph (a) is a lateral aberration graph at the image center on the image plane, the graph (b) at a position of 50% of the image height, and the graph (c) at a position of 100% of the image height. It can be seen that a favorable correction of chromatic aberration is performed at each of those image heights.

Furthermore, in this embodiment, the scanning display optical system 291 is a substantially telecentric optical system. Therefore, it is easy to perform a dioptric adjustment by moving the eyepiece optical system 292 in a direction perpendicular to the primary image forming plane 293 (that is, in a direction parallel to the optical axis of the scanning optical system 17).

Moreover, in this embodiment, the wavelength of the light emitted form the light source is not specified in particular, but by using as the light source a plurality of light-emitting portions with red, green and blue wavelengths, it is possible to configure a full-color retinal scanning type display optical system. If a plurality of light sources are used, then light beams from red, green and blue light sources are combined by an element for combining colors, such as a dichroic prism, and by modulating each of the red, blue and green light sources individually, a color image is attained. Alternatively, it is also possible to attain a color image by directing light of the three colors blue, green and red sequentially (field-sequentially) at the deflection device.

Other than that, it is also possible to combine a white light source with a rotatable turret on which filters of the three colors blue, green and red are arranged, to sequentially direct light of the three colors blue, green and red toward the deflection device.

It should be noted that the description for a control method of the light source and the deflection device when forming a two-dimensional color image using a deflection device and a scanning optical system while directing light of the three colors blue, green and red from the light source toward the deflection device, is omitted.

Embodiments 1 to 8 have been described for the case of using a resonance motion allowing deflection of a light beam in two dimensions with one deflection mirror serving as the deflection device, but it is also possible to use a method of combining two deflectors that can deflect a light beam in only one direction, or instead of using resonance, to use a deflector such as a galvano mirror moving with constant angular speed.

Embodiments 1 to 8 have been described for the case of using glass lenses for the scanning optical system, but the present invention is not limited to this, and by using for example plastic lenses molded by injection molding, manufacturing can be made easier and lower costs can be achieved.

Furthermore, there is also the technique of correcting TV distortion electrically, as proposed in the above-mentioned Japanese Patent Application Laid-Open No. H8-146320, and it is also possible to combine this kind of electrical correction with the optical correction by an optical system of any of the above embodiments to correct image distortions.

In the case of an electrical correction, the angle of inclination of the reflective surface is controlled by a driving circuit (not shown in the drawings) controlling the deflection device when scanning two-dimensionally, such that the remaining distortion after the optical correction is corrected.

Furthermore, using the scanning display optical systems of the above-described embodiments, it is possible to configure other scanning type display apparatus besides electronic viewfinders, such as projectors or the like.

While preferred embodiments have been described, it is to be understood that modification and variation of the present invention may be made without departing from scope of the following claims.

What is claimed is:

1. A scanning type display optical system comprising:
   a deflection device deflecting a light beam from a light source in two dimensions; and
   an image-forming optical system forming an image with the light beam deflected by the deflection device;
   wherein a direction from which the light beam coming from the light source is incident on the deflection device is oblique with respect to at least one of the two deflection axes of the deflection device; and
   the image-forming optical system comprises an optical element which is tilted and/or shifted with respect to a center axis of a two-dimensional deflection range over which the light beam is deflected by the deflection device.

2. The scanning display optical system according to claim 1,
   wherein the image-forming optical system comprises a first optical element having negative optical power, which is arranged on the side closest to the deflection device, a second optical element having positive optical power, which is arranged on the side of an image plane, and a third optical element having positive optical power, which is arranged between the first optical element and the second optical element;
   wherein the third optical element is tilted and shifted with respect to the center axis of the two-dimensional deflection range over which the light beam is deflected by the deflection device, to the side on which the light beam coming from the light source is incident on the deflection device; and
   the second optical element is shifted to the opposite of the side on which the light beam coming from the light source is incident on the deflection device.

3. The scanning type display optical system according to claim 2,
   wherein the second optical element is a meniscus lens whose convex surface faces toward the deflection device; and
   the third optical element is a meniscus lens whose convex surface faces toward an image plane.

4. The scanning type display optical system according to claim 1,
wherein an incident angle of the light beam on an image plane by the image-forming optical system is 5° or less.

5. The scanning type display optical system according to claim 1,
further comprising a reflective surface guiding the light beam from the light source so that the light beam is incident on the deflection device from a direction oblique with respect to the deflection axes.

6. The scanning type display optical system according to claim 1,
further comprising a converging optical element arranged between the light source and the image-forming optical system, and converting the light beam into converging light beam.

7. The scanning type display optical system according to claim 6,
further comprising a reflective surface guiding the light beam from the converging optical element so that the light beam is incident on the deflection device from a direction oblique with respect to the deflection axes.

8. The scanning type display optical system according to claim 2, wherein the following condition is satisfied:

$$v1 < v2$$

where v1 is the Abbe number of the first optical element and v2 is the Abbe number of the second and third optical elements.

9. The scanning type display optical system according to claim 1, further comprising an eyepiece optical system guiding deflected light beam from the image-forming optical system to an eye of an observer.

10. A scanning type display optical system comprising:
a deflection device deflecting a light beam from a light source in two dimensions; and
optical system forming an image to be displayed with the light beam deflected by the deflection device and including a plurality of optical elements with optical powers;
wherein a first optical element of the optical elements, which is arranged on the side closest to the deflection device, is a biconcave lens;
a second optical element of the optical elements, which is arranged on the side closest to an image plane, is a meniscus lens whose convex surface surfaces toward the deflection device; and
an incident angle of the light beam on the image plane by the first optical system is 5° or less.

11. The scanning type display optical system according to claim 10,
further comprising a reflective surface guiding the light beam from the light source to the deflection device.

12. The scanning type display optical system according to claim 10, further comprising an eyepiece optical system guiding deflected light beam from the first optical system to an eye of an observer.

13. A scanning type display optical system comprising:
a deflection device deflecting a light beam from a light source in two dimensions;
a first optical system forming an image to be displayed with the light beam deflected by the deflection device and including a plurality of optical elements with optical powers; and
a converging optical element arranged between the light source and the first optical system, and converting the light beam into converging light beam,
wherein a first optical element of the optical elements, which is arranged on the side closest to the deflection device, is a biconcave lens; and
a second optical element of the optical elements, which is arranged on the side closest to an image plane, is a meniscus lens whose convex surface surfaces toward the deflection device.

14. The scanning type display optical system according to claim 13,
further comprising a reflective surface guiding the light beam from the converging optical element to the deflection device.

15. A scanning type display optical system comprising:
a deflection device deflecting a light beam from a light source in two dimensions; and
a first optical system forming an image to be displayed with the light beam deflected by the deflection device and including a plurality of optical elements with optical powers;
wherein a first optical element of the optical elements, which is arranged on the side closest to the deflection device, is a biconcave lens;
a second optical element of the optical elements, which is arranged on the side closest to an image plane, is a meniscus lens whose convex surface surfaces toward the deflection device; and
the following condition is satisfied:

$$v1 < v2$$

where v1 is the Abbe number of the first optical element and v2 is the Abbe number of the second optical element.

16. A scanning type display optical system comprising:
a deflection device deflecting a light beam form a light source in two dimensions; and
a first optical system forming an image to be displayed with the light beam deflected by the deflection device and including a plurality of optical elements with optical powers;
wherein a first optical element of the optical elements, which is arranged on the side closest to the deflection device, is a biconcave lens;
a second optical element of the optical elements, which is arranged on the side closest to an image plane, is a meniscus lens whose convex surface surfaces toward the deflection device; and
the following condition is satisfied:

$$0.4 \leq D1/D \leq 0.8$$

where D is a distance from the deflection device to the image plane of the first optical system and D1 is a distance from the deflection to an incident surface of the first optical element.

17. A scanning type display optical system comprising:
a deflection device deflecting a light beam form a light source in two dimensions; and
a first optical system forming an image to be displayed with the light beam deflected by the deflection device and including a plurality of optical elements with optical powers;

wherein a first optical element of the optical elements, which is arranged on the side closest to the deflection device, is a biconcave lens;

a second optical element of the optical elements, which is arranged on the side closest to an image plane, is a meniscus lens whose convex surface surfaces toward the deflection device; and the following condition is satisfied:

$$0.5 \leq D1/D \leq 0.3$$

where D is a distance from the deflection device to the image plane of the first optical system and D1 is a distance from the deflection to an incident surface of the first optical element.

18. A scanning type display optical system comprising:

a deflection device deflecting a light beam from a light source in two dimensions;

a first optical system forming an image to be displayed with the light beam deflected by the deflection device and including a plurality of optical elements with optical powers; and a second optical system forming a final image with the light beam of the image at a conjugate position with respect to a position at which the image is formed, wherein a first optical element of the optical elements, which is arranged on the side closest to the deflection device, is a biconcave lens; and a second optical element of the optical elements, which is arranged on the side closest to an image plane, is a meniscus lens whose convex surface surfaces toward the deflection device.

19. A scanning type display apparatus comprising:

a light source; and a scanning type display optical system;

wherein the scanning type display optical system comprises a deflection device deflecting the light beam from the light source in two dimensions and an image-forming optical system forming an image to be displayed with the light beam deflected by the deflection device;

a direction from which the light beam coming from the light source is incident on the deflection device is oblique with respect to at least one of the two deflection axes of the deflection device; and the image-forming optical system comprises an optical element which is tilted and/or shifted with respect to a center axis of a two-dimensional deflection range over which the light beam is deflected by the deflection device.

20. A scanning type display apparatus comprising:

a light source; and a scanning type display optical system;

wherein the scanning type display optical system comprises a deflection device deflecting the light beam from the light source in two dimensions and a first optical system forming an image to be displayed with the light beam deflected by the deflection device and including a plurality of optical elements with optical powers;

a first optical element of the optical elements, which is arranged on the side closest to the deflection device, is a biconcave lens;

a second optical element of the optical elements,, which is arranged on the side closest to an image plane, is a meniscus lens whose convex surface surfaces toward the deflection device; and an incident angle of the light beam on the image plane by the first optical system 5° or less.

21. A scanning type display optical system comprising:

a deflection device deflecting a light beam from a light source in two dimensions; and a first optical system forming a first image to be displayed with the light beam deflected by the deflection device and including a plurality of optical elements with optical powers;

wherein an optical axis of one of the optical elements is tilted and/or shifted with respect to an optical axis of other optical element.

22. The scanning type display optical system according to claim 21, further comprising a second optical system forming a second image with the light beam of the first image at conjugate position with respect to a position at which the first image is formed.

23. A scanning type display apparatus comprising:

a light source; and a scanning type display optical system;

wherein the scanning type display optical system comprises a deflection the light beam from the light source in two dimensions and a first optical system forming a first image to be displayed with the light beam deflected by the deflection device and including a plurality of optical elements with optical powers; and an optical axis of one of the optical elements is tilted and/or shifted with respect to an optical axis of other optical element.

24. A scanning type display optical system comprising:

a deflection device deflecting a light beam from a light source in two dimensions;

a first optical system forming a first image to be displayed with the light beam deflected by the deflection device and including a plurality of optical elements with optical powers; and a second optical system forming a second image with the light beam of the first image at conjugate position with respect to a position at which the first image is formed, wherein a first optical element of the optical elements, which is arranged on the side closest to the deflection device, is a biconcave lens; and a second optical element of the optical elements, which is arranged on the side closest to a first image plane, is a meniscus lens whose convex surface surfaces toward the deflection device.

25. A scanning type display apparatus comprising:

a light source; and a scanning type display optical system;

wherein the scanning type display optical system comprises a deflection device deflecting a light beam from a light source in two dimensins, a first optical system forming a first image to be displayed with the light beam deflected by the deflection device and including a plurality of optical elements with optical powers, and a second optical system forming a second image with the light beam of the first image at conjugate position with respect to a position at which the first image is formed;

a first optical element of the optical elements, which is arranged on the side closest to the deflection device, is a bioconcave lens; and a second optical element of the optical elements, which is arranged on the side closest to a first image plane, is a meniscus lens whose convex surface surfaces toward the deflection device.

26. A scanning type display apparatus comprising:

a light source; and a scanning type display optical system;

wherein the scanning type display optical system comprises a deflection device deflecting a light beam from a light source in two dimensions, a first optical system forming an image to be displayed with the light beam deflected by the deflection device and including a plurality of optical elements with optical powers, and a converging optical element arranged between the light source and the first optical system and converting the light beam into converging light beam;

a first optical elements, which is arrranged on the side closest to the deflection device, is a biconcave lens; and a second optical element of the optical elements, which is arranged on the side closest to an image plane, is a meniscus lens whose convex surface surfaces toward the deflection device.

27. A scanning type display apparatus comprising:

a light source; and a scanning type display optical system;

wherein the scanning type display optical system comprises a deflection device deflecting a light beam from a light source in two dimensions, and a first optical system forming an image t obe displayed with the light beam deflected by the deflection device and including a plurality of optical elements with optical powers;

a first optical element of the optical elements, which is arranged on the side closest to the deflection device, is a biconcave lens;

a second optical element of the optical elements, which is arranged on the side closest to an image plane, is a meniscus lens whose convex surface surfaces toward the deflection device; and the following condition is satisfied $$v > v$$

where v1 is the Abbe number of the first optical element and v2 is the Abbe number of the second optical element.

28. A scanning type display apparatus comprising:

a light source; and a scanning type display optical system;

wherein the scanning type display optical system comprises a deflection device deflecting a light beam from a light source in two dimensions, and a first optical system forming an image to be displayed with the light beam deflected by the deflection device and including a plurality of optical elements with optical powers;

a first optical element of the optical elements, which is arranged on the side closest to the deflection device, is a biconcave lens;

a second optical element of the optical elements, which is arranged on the side closest to an image plane, is a meniscus lens whose convex surface surfaces toward the deflection device; and the following condition is satisfied:

$$0.4 \leq D1/D \leq 0.8$$

where D is a distance from the deflection device to the image plane of the first optical system and D1 is a distance from the deflection device to an incident surface of the first optical element.

29. A scanning type display apparatus comprising:

a light source; and a scanning type display optical system;

wherein the scanning type display optical system comprises a deflection device deflecting a light beam from a light source in two dimensions, and a first optical system forming an image to be displayed with the light beam deflected by the deflection device and including a plurality of optical elements with optical powers;

a first optical element of the optical elements, which is arranged on the side closest to the deflection device, is a biconcave lens;

a second optical element of the optical elements, which is arranged on the side closest to an image plane, is a meniscus lens whose convex surface surfaces toward the deflection device; and the following condition is satisfied:

$$0.05 \leq D2/D \leq 0.3$$

where D is a distance from the deflection device to the image plane of the first optical system and D2 is a distance from an incident surface of the second optical element to the image plane of the first optical system.

30. A scanning type display apparatus comprising:

a light source; and a scanning type display optical system;

wherein the scanning type display optical system comprises a deflection device deflecting a light beam from a light source in two dimensions, a first optical system forming an image to be displayed with the light beam deflected by the deflection device and including a plurality of optical elements with optical powers; and a second optical system forming a final image with the light beam of the image at a conjugate position with respect to a position at which the image is formed;

a first optical element of the optical elements, which is arranged on the side closest to the deflection device, is a biconcave lens; and a second optical element of the optical elements, which is arranged on the side closest to an image plane, is a meniscus lens whose convex surface surfaces toward the deflection device.

* * * * *

UNITED STATES PATENT AND TRADEMARK OFFICE
CERTIFICATE OF CORRECTION

PATENT NO. : 6,980,367 B2
DATED : December 27, 2005
INVENTOR(S) : Yamamoto

It is certified that error appears in the above-identified patent and that said Letters Patent is hereby corrected as shown below:

Title page,
Item [56], References Cited, U.S. PATENT DOCUMENTS, add:
-- 5,633,736 A      07/1997      Griffin *et al.*
   5,715,079 A      01/1998      Ono --.

Column 26,
Line 30, add -- to be displayed -- between "image" and "width".

Column 28,
Lines 38 and 62, change "form" to -- from --.

Column 29,
Line 10, change "0.5 D1/D 0.3" to -- 0.5 D2/D 0.3 --.

Column 30,
Line 1, change the ",," to -- , --.
Line 28, add -- device deflecting -- between "deflection" and "the".
Line 60, change "dimensins" to -- dimensions --.

Column 31,
Line 21, add -- element of the optical -- between "optical" and "element".
Line 46, change ">" to -- 1 > 2 --.

Signed and Sealed this

Twenty-fifth Day of April, 2006

JON W. DUDAS
*Director of the United States Patent and Trademark Office*